United States Patent
Bang et al.

(10) Patent No.: US 11,385,751 B2
(45) Date of Patent: Jul. 12, 2022

(54) SENSING UNIT AND DISPLAY DEVICE INCLUDING THE SAME

(71) Applicant: SAMSUNG DISPLAY CO., LTD., Yongin-si (KR)

(72) Inventors: Ki Ho Bang, Hwaseong-si (KR); Yong Hwan Park, Cheonan-si (KR); Chi Wook An, Hwaseong-si (KR); Seong Jun Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/878,666

(22) Filed: May 20, 2020

(65) Prior Publication Data

US 2021/0141490 A1 May 13, 2021

(30) Foreign Application Priority Data

Nov. 8, 2019 (KR) .................. 10-2019-0142424

(51) Int. Cl.
*G06F 3/044* (2006.01)
*G02F 1/1334* (2006.01)
*G02F 1/13363* (2006.01)
*G06F 1/16* (2006.01)
*G02F 1/1333* (2006.01)

(52) U.S. Cl.
CPC .......... *G06F 3/0446* (2019.05); *G02F 1/1334* (2013.01); *G02F 1/13363* (2013.01); *G02F 1/133305* (2013.01); *G06F 1/1616* (2013.01); *G06F 1/1626* (2013.01); *G06F 3/0443* (2019.05); *G02F 1/133342* (2021.01)

(58) Field of Classification Search
USPC ................................ 345/170–178
See application file for complete search history.

(56) References Cited

U.S. PATENT DOCUMENTS

| | | | |
|---|---|---|---|
| 2011/0180856 A1* | 7/2011 | Ahn .................. | G01N 27/4145 257/253 |
| 2012/0127099 A1* | 5/2012 | Liu ...................... | G06F 3/0443 345/173 |
| 2013/0241873 A1* | 9/2013 | Kim ................... | G06F 3/04164 345/174 |
| 2014/0375911 A1* | 12/2014 | Lee .................... | G02F 1/13338 349/12 |
| 2015/0370380 A1* | 12/2015 | Hong ..................... | G06F 3/044 345/174 |
| 2016/0253001 A1* | 9/2016 | Sugita ................. | G06F 3/04166 345/174 |
| 2016/0266670 A1* | 9/2016 | Chen .................... | G06F 3/0412 |
| 2017/0185184 A1* | 6/2017 | Kim ................... | G06F 3/04164 |
| 2017/0277313 A1* | 9/2017 | Lee ....................... | G06F 1/1686 |

(Continued)

FOREIGN PATENT DOCUMENTS

KR 10-2017-0077910 7/2017
KR 10-2018-0014384 2/2018

*Primary Examiner* — Krishna P Neupane
(74) *Attorney, Agent, or Firm* — F. Chau & Associates, LLC

(57) ABSTRACT

A sensing unit includes a plurality of first sensing electrodes of a first group disposed in a sensing area in a first direction, and a first sensing line electrically connected to one of the first sensing electrodes of the first group. The first sensing line is disposed in the sensing area and extends in a second direction intersecting the first direction.

22 Claims, 23 Drawing Sheets

(56) References Cited

U.S. PATENT DOCUMENTS

| | | | |
|---|---|---|---|
| 2017/0308221 A1* | 10/2017 | Li | G06F 3/0447 |
| 2017/0315395 A1* | 11/2017 | Yeh | G02F 1/13338 |
| 2017/0364194 A1* | 12/2017 | Jang | H01L 27/3262 |
| 2018/0101270 A1* | 4/2018 | Cho | G06F 3/0412 |
| 2018/0284505 A1* | 10/2018 | Ye | G02F 1/1343 |
| 2019/0025956 A1* | 1/2019 | Lee | G06F 3/0448 |
| 2019/0223289 A1* | 7/2019 | Kim | G02F 1/136277 |
| 2019/0265827 A1* | 8/2019 | Liu | G06F 3/0412 |
| 2019/0332210 A1* | 10/2019 | Lee | G06F 3/044 |
| 2020/0012388 A1* | 1/2020 | Zhong | G06F 3/0446 |
| 2020/0081580 A1* | 3/2020 | Kim | G06F 3/0446 |
| 2020/0133438 A1* | 4/2020 | Kim | G06F 3/0448 |
| 2020/0159350 A1* | 5/2020 | Yang | G06F 3/04164 |
| 2020/0285347 A1* | 9/2020 | Ma | G09G 3/36 |
| 2020/0293134 A1* | 9/2020 | Shim | G06F 3/0443 |
| 2020/0326799 A1* | 10/2020 | Moon | G06F 3/0412 |
| 2020/0341590 A1* | 10/2020 | Li | H01L 51/5228 |
| 2020/0356214 A1* | 11/2020 | Kim | H01L 27/323 |
| 2021/0141490 A1* | 5/2021 | Bang | G06F 3/04164 |
| 2021/0232258 A1* | 7/2021 | Wang | G06F 3/04166 |

\* cited by examiner

SENSING UNIT AND DISPLAY DEVICE INCLUDING THE SAME

CROSS-REFERENCE TO RELATED APPLICATIONS

This application claims priority under 35 U.S.C. § 119 to Korean Patent Application No. 10-2019-0142424, filed on Nov. 8, 2019 in the Korean Intellectual Property Office, the disclosure of which is incorporated by reference herein in its entirety.

TECHNICAL FIELD

Exemplary embodiments of the present disclosure relate to a sensing unit and a display device including the same.

DISCUSSION OF THE RELATED ART

Electronic devices, such as smartphones, tablet personal computers (PCs), digital cameras, laptop computers, navigation devices, and televisions (TVs), which provide images to a user, include a display device for displaying an image. The display device includes a display panel configured to generate and display an image and various input devices.

A sensing unit may be one of a plurality of information input devices and may be provided and used in the display device. The sensing unit may be attached to one surface of the display panel of the display device or may be manufactured integrally with the display panel. A user may input information by pressing or touching the sensing unit while viewing an image displayed on a screen of the display device.

The sensing unit may include first sensing electrodes electrically connected in one direction and second sensing electrodes electrically connected in the other direction intersecting the one direction, and may include sensing lines connected to the sensing electrodes.

SUMMARY

Aspects of the present disclosure provide a sensing unit allowing a non-display area to be reduced, and a display device allowing a non-display area to be reduced.

According to an exemplary embodiment, a sensing unit includes a plurality of first sensing electrodes of a first group disposed in a sensing area in a first direction, and a first sensing line electrically connected to one of the first sensing electrodes of the first group. The first sensing line is disposed in the sensing area and extends in a second direction intersecting the first direction.

According to an exemplary embodiment, a sensing unit includes a plurality of first sensing electrodes of a first group disposed in a sensing area in a first direction, and a plurality of first sensing electrodes of a second group disposed in the first direction, in which the second group is spaced apart from the first group. The sensing unit further includes a first sensing line electrically connected to one of the first sensing electrodes of the first group. The first sensing line is disposed in the sensing area and overlaps the first sensing electrodes of the second group in a thickness direction thereof.

According to an exemplary embodiment, a display device includes a substrate including a display area, a light-emitting layer disposed on the substrate, and a sensing unit disposed on the light-emitting layer. The sensing unit includes a plurality of first sensing electrodes of a first group disposed in a sensing area overlapping the display area in a first direction, and a first sensing line electrically connected to one of the first sensing electrodes of the first group. The first sensing line is disposed in the sensing area and extends in a second direction intersecting the first direction.

BRIEF DESCRIPTION OF THE DRAWINGS

The above and other aspects and features of the present disclosure will become more apparent by describing in detail exemplary embodiments thereof with reference to the accompanying drawings, in which.

DETAILED DESCRIPTION OF THE EXEMPLARY EMBODIMENTS

Figure 1:
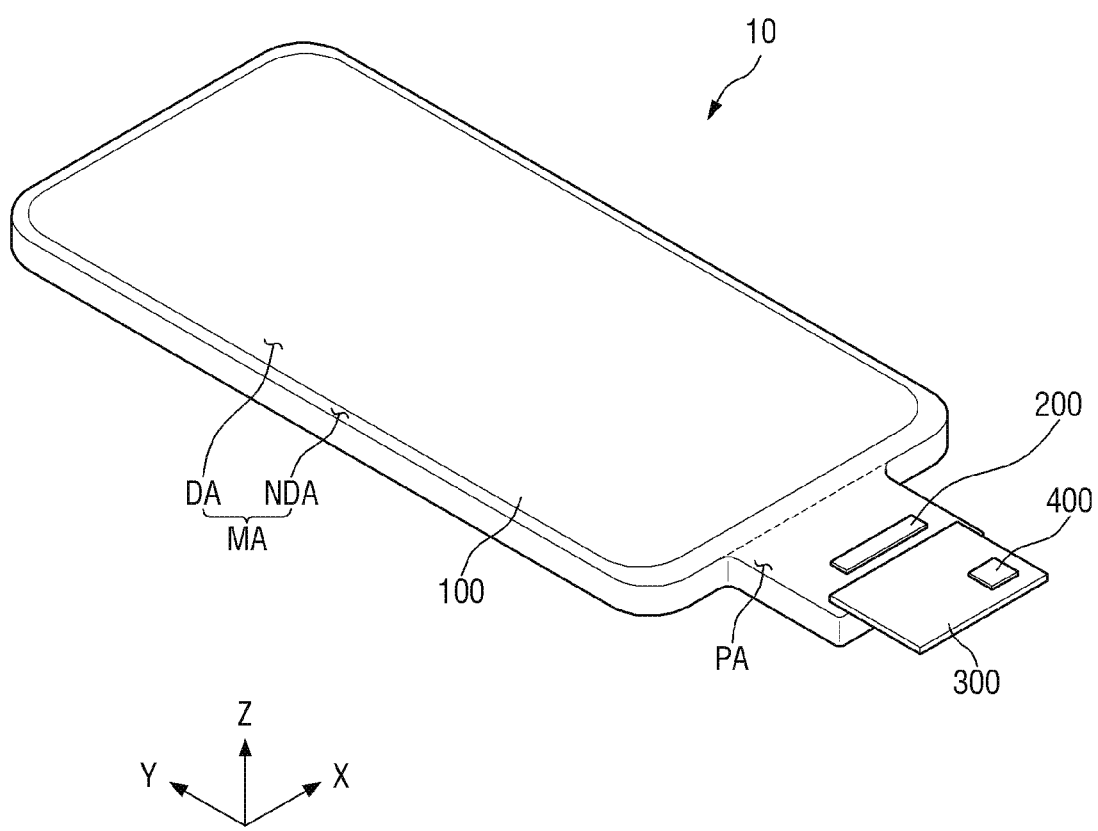
FIG. 1 is a perspective view of a display device according to an exemplary embodiment.

Exemplary embodiments of the present disclosure will be described more fully hereinafter with reference to the accompanying drawings. Like reference numerals may refer to like elements throughout the accompanying drawings.

It will be understood that when a component such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationship between elements should be interpreted in a like fashion.

Although the terms "first", "second", etc. may be used herein to describe various elements, these elements should not be limited by these terms. These terms may be used to distinguish one element from another element. Thus, a first element described below may be termed a second element without departing from teachings of one or more exemplary embodiments.

Features of various exemplary embodiments of the present disclosure may be combined partially or totally. Technically various interactions and operations are possible. The various exemplary embodiments can be practiced individually or in combination.

It should be understood that descriptions of features or aspects within each exemplary embodiment should typically be considered as available for other similar features or aspects in other exemplary embodiments, unless the context clearly indicates otherwise.

As used herein, the singular forms "a", "an" and "the" are intended to include the plural forms as well, unless the context clearly indicates otherwise.

Herein, when two or more elements or values are described as being substantially the same as or about equal to each other, it is to be understood that the elements or values are identical to each other, indistinguishable from each other, or distinguishable from each other but functionally the same as each other as would be understood by a person having ordinary skill in the art. For example, when two or more elements or values are substantially the same as or about equal to each other but are not identical to each other, it is to be understood that the two or more elements or values are approximately the same as or equal to each other within a measurement error as would be understood by a person having ordinary skill in the art.

Figure 2:
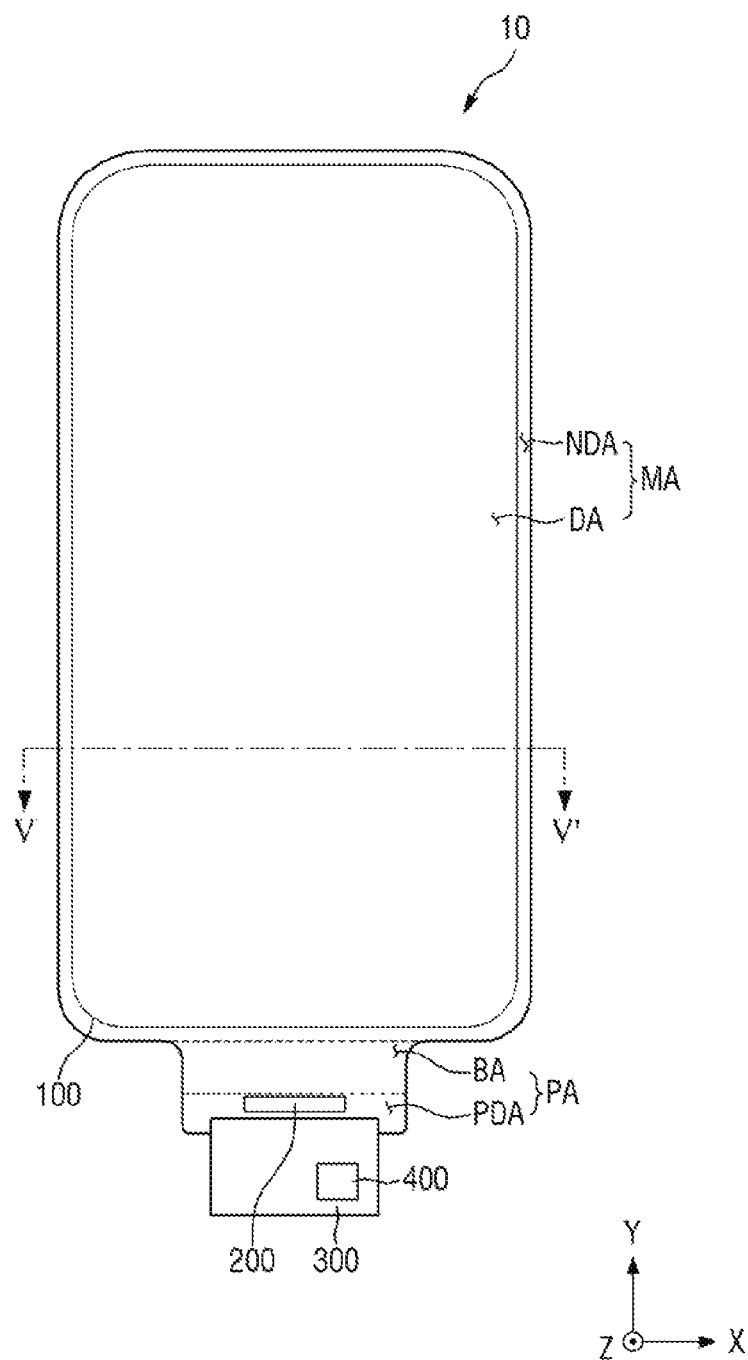
FIG. 2 is a plan view of the display device of FIG. 1.
Figure 3:
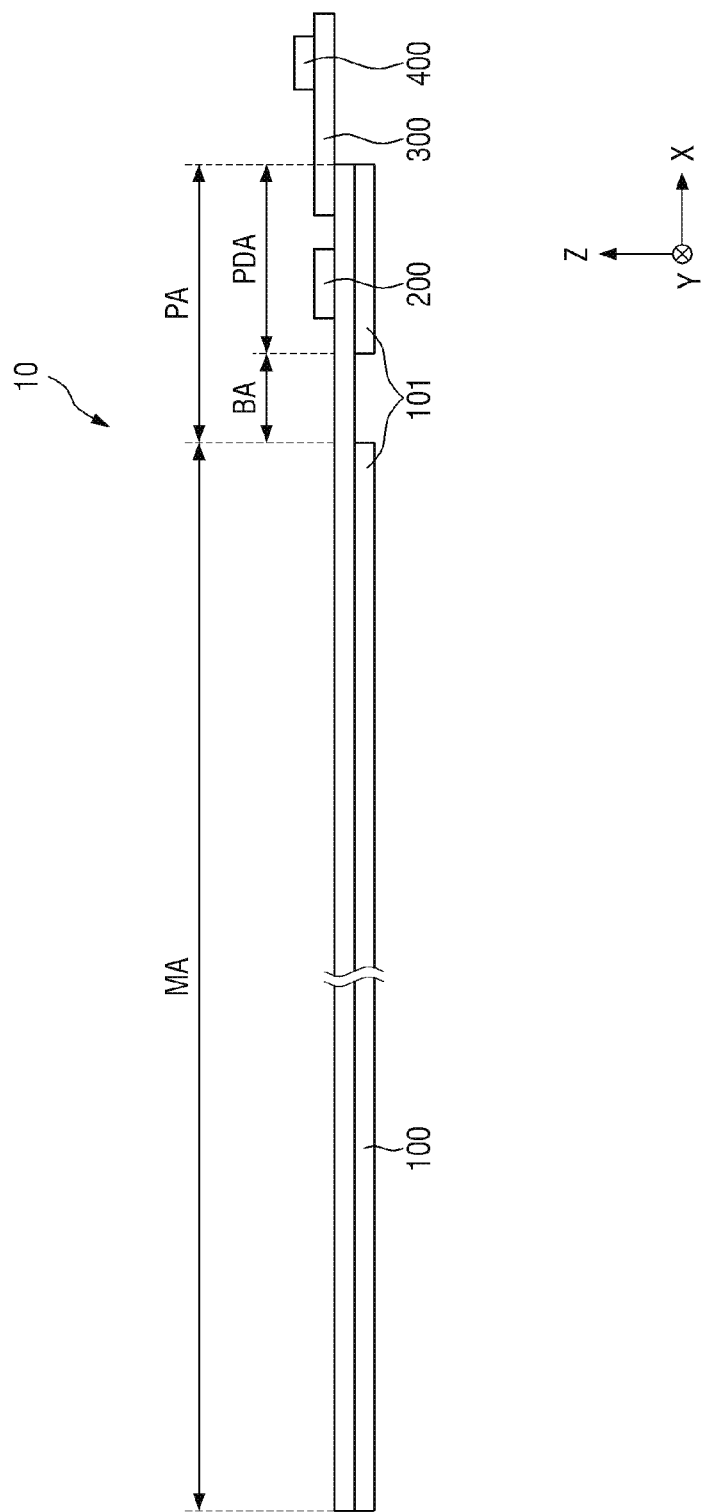
FIGS. 3 and 4 are side views of the display device of FIG. 1.
Figure 4:
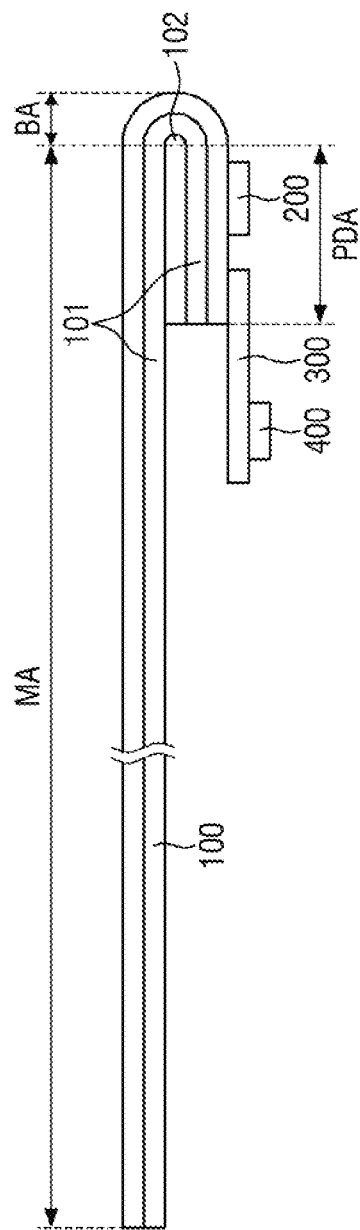

FIG. 1 is a perspective view of a display device according to an exemplary embodiment. FIG. 2 is a plan view of the display device of FIG. 1. FIGS. 3 and 4 are side views of the display device of FIG. 1.

In the present specification, the terms "above," "upper portion," "top," and "upper surface" refer to an upward direction, that is, a positive Z-axis direction, based on a display panel 100, and the terms "below," "lower portion," "bottom," and "lower surface" refer to a downward direction, that is, a negative Z-axis direction, based on the display panel 100. Further, the terms "left," "right," "upper," and "lower" refer to directions when the display panel 100 is viewed in a plan view. For example, the term "right" refers to a positive X-axis direction, the term "left" refers to a negative X-axis direction, the term "upper" refers to a positive Y-axis direction, and the term "lower" refers to a negative Y-axis direction.

Referring to FIGS. 1 to 4, a display device 10 is a device which displays a still image or a moving image. The display device 10 may be used as a display screen of portable electronic devices such as, for example, a mobile phone, a smartphone, a tablet personal computer (PC), a smartwatch, a mobile communication terminal, an electronic notebook, an electronic book, a portable multimedia player (PMP), a navigation device, and an ultra-mobile PC (UMPC), and may also be used as a display screen of various products such as, for example, a television, a laptop computer, a monitor, a billboard, and an Internet of Things (IoT) device. The display device 10 may be any one of, for example, an organic light-emitting display device, a liquid crystal display device, a plasma display device, a field emission display device, an electrophoretic display device, an electro-wetting display device, a quantum dot light-emitting display device, and a micro light-emitting diode (LED) display device. Hereinafter, it will be mainly described that the display device 10 is the organic light-emitting display device, but the present disclosure is not limited thereto.

The display device 10 according to an exemplary embodiment includes a display panel 100, a display driving circuit 200, a circuit board 300, and a touch driving circuit 400.

The display panel 100 may include a main area MA and a protrusion area PA protruding from one side of the main area MA.

The main area MA may be formed as a rectangular plane which has short sides in a first direction (X-axis direction) and long sides in a second direction (Y-axis direction) intersecting the first direction (X-axis direction). A corner at which the short side in the first direction (X-axis direction) meets the long side in the second direction (Y-axis direction) may be rounded to have a certain curvature or formed at a right angle. A planar shape of the display device 10 is not limited to a quadrilateral shape but may be formed in another shape such as, for example, a polygonal shape, circular shape, or elliptical shape. The main area MA may be formed to be flat, but the present disclosure is not limited thereto. The main area MA may include curved portions formed at left and right end portions thereof. In this case, the curved portion may have a constant curvature or have a variable curvature.

The main area MA may include a display area DA in which pixels are formed to display an image, and a non-display area NDA which is a peripheral area of the display area DA and in which pixels are not formed.

In addition to the pixels, scan lines, data lines, and power lines connected to the pixels may be disposed in the display area DA. When the main area MA includes the curved portion, the display area DA may be disposed on the curved portion. In this case, an image of the display panel 100 may also be viewed on the curved portion.

The non-display area NDA may be defined as an area from the outside of the display area DA to an edge of the display panel 100. A scan driver configured to apply scan signals to the scan lines and link lines configured to connect the data lines and the display driving circuit 200 may be disposed in the non-display area NDA.

The protrusion area PA may protrude from one side of the main area MA. For example, as shown in FIG. 2, the protrusion area PA may protrude from a lower side of the main area MA. A length of the protrusion area PA in the first direction (X-axis direction) may be less than a length of the main area MA in the first direction (X-axis direction).

The protrusion area PA may include a bending area BA and a pad area PDA. In this case, the pad area PDA may be disposed at one side of the bending area BA, and the main area MA may be disposed at the other side of the bending area BA. For example, the pad area PDA may be disposed at a lower side of the bending area BA, and the main area MA may be disposed at an upper side of the bending area BA.

The display panel 100 may be formed to be flexible so as to be bendable, foldable, or rollable. Therefore, the display panel 100 may be bent in a thickness direction (Z-axis direction) from the bending area BA. As shown in FIG. 3, before the display panel 100 is bent, one surface of the pad area PDA of the display panel 100 faces upward. As shown in FIG. 4, after the display panel 100 is bent, one surface of the pad area PDA of the display panel 100 faces downward.

Accordingly, the pad area PDA may be disposed on a lower portion of the main area MA and thus may overlap the main area MA.

Pads electrically connected to the display driving circuit 200 and the circuit board 300 may be disposed in the pad area PDA of the display panel 100.

A panel lower cover 101 may be disposed below the display panel 100. The panel lower cover 101 may be attached to a lower surface of the display panel 100 through an adhesive member. The adhesive member may be a pressure sensitive adhesive (PSA).

The panel lower cover 101 may include a light absorption member configured to absorb light incident from the outside, a buffer member configured to absorb an external impact, and a heat dissipation member configured to efficiently dissipate heat from the display panel 100.

The light absorption member may be disposed below the display panel 100. The light absorption member blocks transmission of light to prevent components disposed below the light absorption member, i.e., the circuit board 300 and the like, from being viewed from above the display panel 100. The light absorption member may include a light absorption material such as a black pigment or a black dye.

The buffer member may be disposed below the light absorption member. The buffer member absorbs an external impact to prevent the display panel 100 from being damaged. The buffer member may include a single layer or a plurality of layers. For example, the buffer member may be made of a polymer resin such as, for example, polyurethane, polycarbonate, polypropylene, or polyethylene, or may be made of a material having elasticity, such as a sponge formed by foam-molding rubber, a urethane-based material, or an acrylic-based material. The buffer member may be a cushioning layer.

The heat dissipation member may be disposed below the buffer member. The heat dissipation member may include a first heat dissipation layer including graphite or carbon nanotubes, and a second heat dissipation layer formed as a thin film made of a metal such as, for example, copper, nickel, ferrite iron, or silver, which is capable of shielding an electromagnetic wave and has high heat conductivity.

As shown in FIG. 3, in order for the display panel 100 to be easily bent, in an exemplary embodiment, the panel lower cover 101 is not disposed in the bending area BA of the display panel 100. Since the display panel 100 is bent in the bending area BA and the pad area PDA is disposed below the main area MA, the pad area PDA may overlap the main area MA. Accordingly, the panel lower cover 101 disposed in the main area MA of the display panel 100 and the panel lower cover 101 disposed in the pad area PDA of the display panel 100 may be attached through an adhesive member 102. The adhesive member 102 may be a PSA.

The display driving circuit 200 outputs signals and voltages for driving the display panel 100. For example, the display driving circuit 200 may supply data voltages to the data lines. In addition, the display driving circuit 200 may supply a power voltage to a power line and may supply scan control signals to the scan driver. The display driving circuit 200 may be formed as an integrated circuit (IC) and may be mounted on the display panel 100 in the pad area PDA through, for example, a chip-on-glass (COG) method, a chip-on-plastic (COP) method, or an ultrasonic bonding method, but the present disclosure is not limited thereto. For example, the display driving circuit 200 may be mounted on the circuit board 300.

The pads may include display pads electrically connected to the display driving circuit 200 and sensing pads electrically connected to sensing lines.

The circuit board 300 may be attached onto the pads using an anisotropic conductive film. As a result, lead lines of the circuit board 300 may be electrically connected to the pads. The circuit board 300 may be a flexible printed circuit board, a printed circuit board, or a flexible film such as a chip-on film.

The touch driving circuit 400 may be connected to sensing electrodes of a sensing layer TSL of the display panel 100. The touch driving circuit 400 applies driving signals to the sensing electrodes of the sensing layer TSL and measures mutual capacitance values of the sensing electrodes. The driving signal may be a signal having a plurality of driving pulses. The touch driving circuit 400 may determine, based on the mutual capacitance values, whether a touch of a user is input and whether the user is in proximity to the display device 10. The touch of the user indicates that an object such as a user's finger or pen directly touches one surface of the display device 10 which is disposed on the sensing layer TSL. The proximity of the user indicates that an object such as the user's finger or pen hovers over the one surface of the display device 10 without touching the one surface of the display device 10.

The touch driving circuit 400 may be disposed on the circuit board 300. The touch driving circuit 400 may be formed as an IC and mounted on the circuit board 300.

Figure 5:
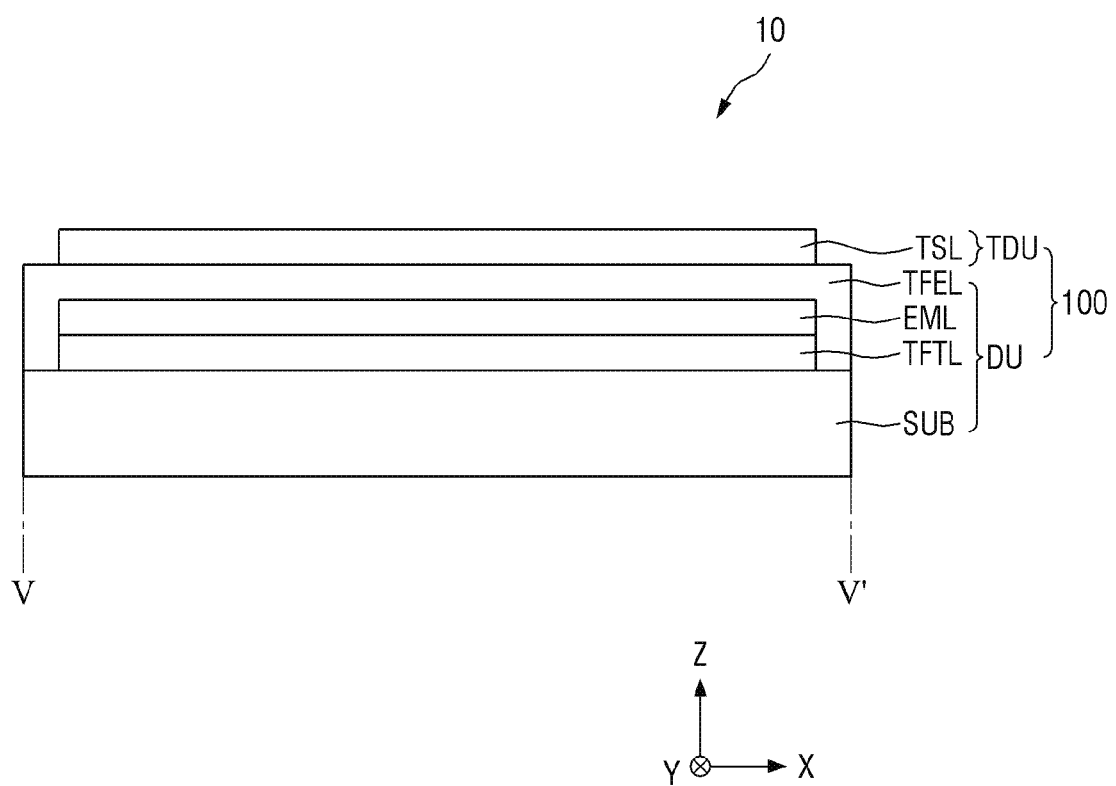
FIG. 5 is a cross-sectional view taken along line V-V' of FIG. 2.

FIG. 5 is a cross-sectional view taken along line V-V' of FIG. 2.

Referring to FIG. 5, the display panel 100 may include a display unit DU which includes a substrate SUB, and a thin film transistor layer TFTL, a light-emitting element layer EML, and a thin film encapsulation layer TFEL which are disposed on the substrate SUB, and a sensing unit TDU which includes the sensing layer TSL.

The substrate SUB may be made of an insulating material such as, for example, glass, quartz, or a polymer resin. Examples of the polymer resin may be one selected from among polyethersulphone (PES), polyacrylate (PA), polyarylate (PAR), polyetherimide (PEI), polyethylene naphthalate (PEN), polyethylene terephthalate (PET), polyphenylene sulfide (PPS), polyarylate, polyimide (PI), polycarbonate (PC), cellulose triacetate (CAT), cellulose acetate propionate (CAP), and a combination thereof. Alternatively, the substrate SUB may include a metallic material.

The substrate SUB may be a rigid substrate or a flexible substrate which is bendable, foldable, or rollable. When the substrate SUB is the flexible substrate, the substrate SUB may be made of PI, but the present disclosure is not limited thereto.

Figure 6:
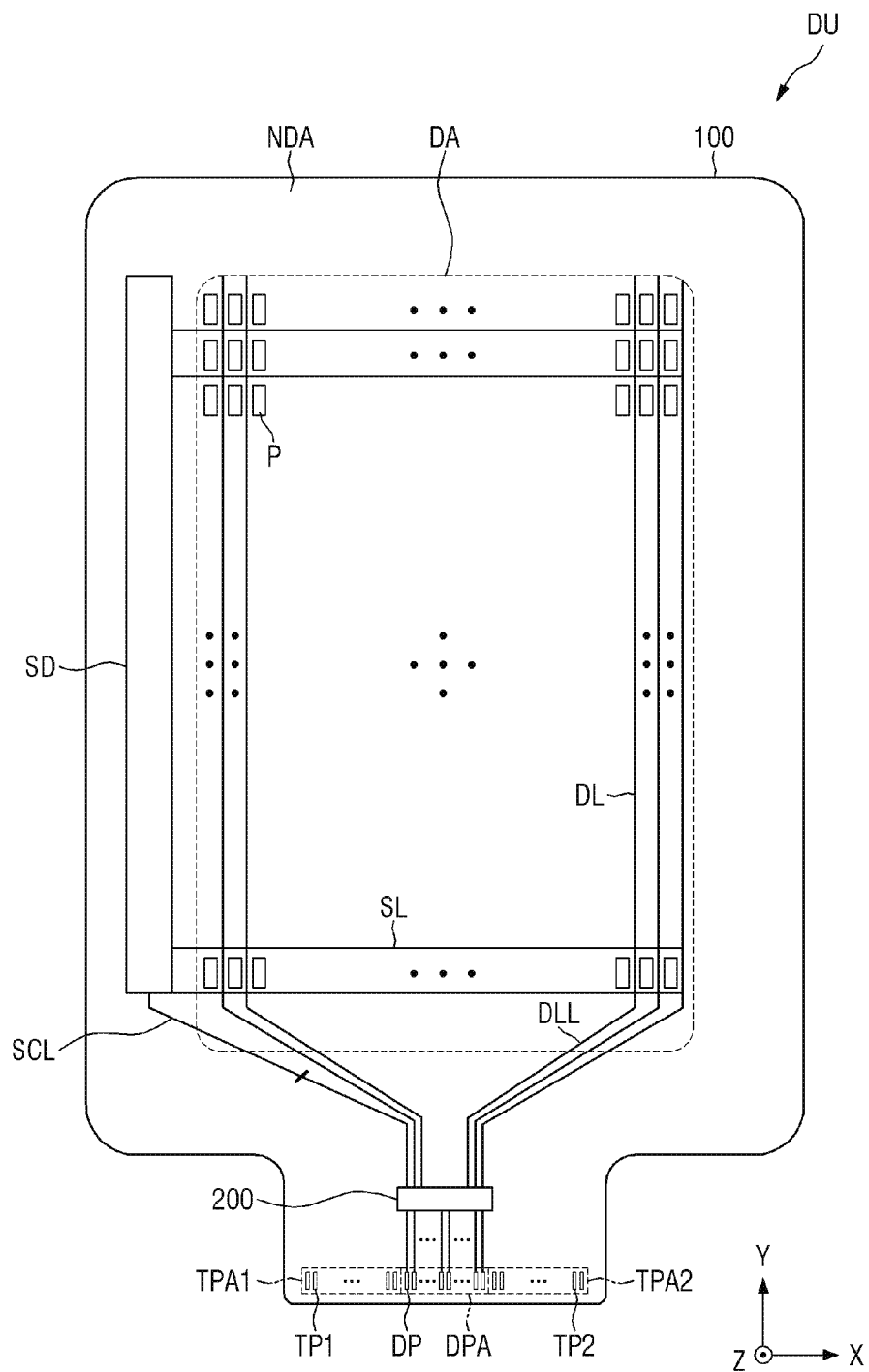
FIG. 6 is a plan view illustrating components related to a display unit of FIG. 5.

The thin film transistor layer TFTL may be disposed on the substrate SUB. In addition to thin film transistors of each of the pixels, scan lines, data lines, power lines, scan control lines, and routing lines connecting the pads and the data lines may be formed in the thin film transistor layer TFTL. Each of the thin film transistors may include a gate electrode, a semiconductor layer, a source electrode, and a drain electrode. When a scan driver SD is formed in the non-display area NDA of the display panel 100 as shown in FIG. 6, the scan driver SD may include thin film transistors.

The thin film transistor layer TFTL may be disposed in the display area DA and the non-display area NDA. For example, the thin film transistors of each of the pixels, the scan lines, the data lines, and the power lines of the thin film transistor layer TFTL may be disposed in the display area DA. The scan control lines and link lines of the thin film transistor layer TFTL may be disposed in the non-display area NDA. The thin film transistor layer TFTL will be described in detail below with reference to FIGS. 15 and 16.

The light-emitting element layer EML may be disposed on the thin film transistor layer TFTL. The light-emitting element layer EML may include pixels which each include a first electrode, a light-emitting layer, and a second electrode, and a pixel definition layer which defines the pixels. The light-emitting layer may be an organic light-emitting layer including an organic material. In this case, the light-emitting layer may include a hole transport layer, an organic light-emitting layer, and an electron transport layer. When a certain voltage is applied to the first electrode through the thin film transistor of the thin film transistor layer TFTL and a cathode voltage is applied to the second electrode, holes and electrons are moved to the organic light-emitting layer through the hole transport layer and the electron transport layer and are combined with each other in the organic light-emitting layer to emit light. The pixels of the light-emitting element layer EML may be disposed in the display area DA. The light-emitting element layer EML will be described in detail below with reference to FIGS. 15 and 16.

The thin film encapsulation layer TFEL may be disposed on the light-emitting element layer EML. The thin film encapsulation layer TFEL serves to prevent oxygen or moisture from permeating into the light-emitting element layer EML. To this end, the thin film encapsulation layer TFEL may include at least one inorganic layer. The inorganic layer may be, for example, a silicon nitride layer, a silicon oxynitride layer, a silicon oxide layer, a titanium oxide layer, or an aluminum oxide layer, but is not limited thereto. In addition, the thin film encapsulation layer TFEL serves to protect the light-emitting element layer EML from foreign substances such as dust. To this end, the thin film encapsulation layer TFEL may include at least one organic layer. The organic layer may be made of, for example, an acryl resin, an epoxy resin, a phenolic resin, a polyamide resin, a polyimide resin, or the like, but the present disclosure is not limited thereto.

The thin film encapsulation layer TFEL may be disposed in both of the display area DA and the non-display area NDA. For example, the thin film encapsulation layer TFEL may be disposed to cover the light-emitting element layer EML of the display area DA and the non-display area NDA and cover the thin film transistor layer TFTL of the non-display area NDA. The thin film encapsulation layer TFEL will be described in detail below with reference to FIGS. 15 and 16.

The sensing layer TSL may be disposed on the thin film encapsulation layer TFEL. Since the sensing layer TSL is disposed directly on the thin film encapsulation layer TFEL, a thickness of the display device 10 may be decreased compared to a case in which a separate touch panel including the sensing layer TSL is attached onto the thin film encapsulation layer TFEL.

Figure 7:
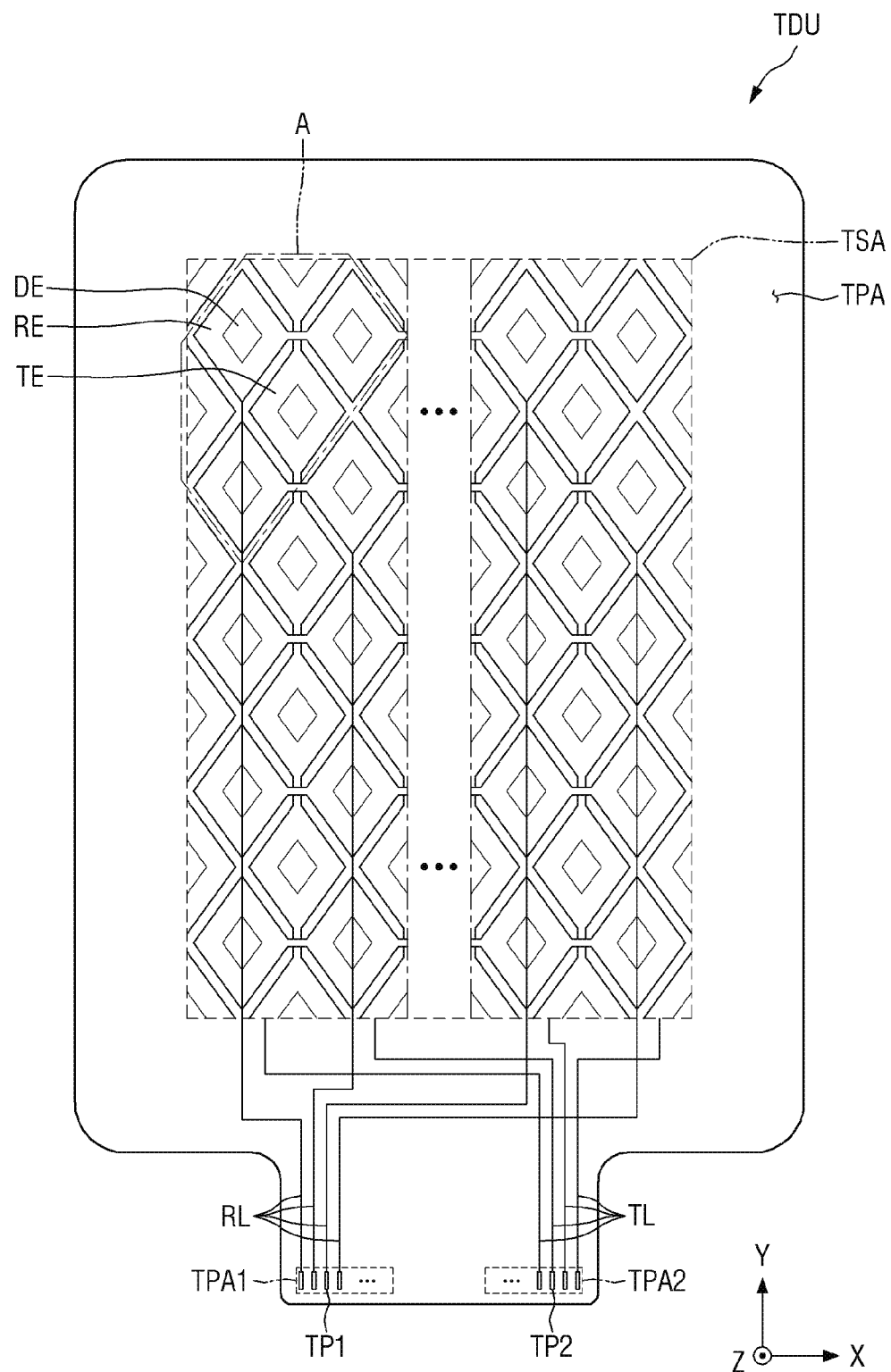
FIG. 7 is a plan view illustrating components related to a sensing unit of FIG. 5.

The sensing layer TSL may include a plurality of sensing electrodes for sensing a touch of a user using a mutual capacitance method and sensing lines connecting the pads and the sensing electrodes. As shown in FIG. 7, the sensing electrodes of the sensing layer TSL may be disposed in a sensing area TSA overlapping the display area DA. As shown in FIG. 7, the sensing lines of the sensing layer TSL may be disposed to partially overlap the sensing area TSA. Accordingly, the non-display area NDA of the display device 10 may be reduced, which will be described below.

A polarizing film may be disposed on the sensing layer TSL. The polarizing film may include a linear polarizer and a phase retardation film such as a quarter-wave plate. In this case, the phase retardation film may be disposed on the sensing layer TSL, and the linear polarizer may be disposed on the phase retardation film. In addition, a cover window may be disposed on the polarizing film. The cover window may be attached onto the polarizing film through a transparent adhesive member such as an optically clear adhesive (OCA) film.

FIG. 6 is a plan view illustrating components related to the display unit DU of FIG. 5.

For convenience of description, only pixels P, scan lines SL, data lines DL, scan control lines SCL, fan-out lines DLL, the scan driver SD, the display driving circuit 200, and display pads DP of the display unit DU are shown in FIG. 6.

Referring to FIG. 6, the scan lines SL, the data lines DL, and the pixels P are disposed in the display area DA. The scan lines SL may be formed parallel to each other in the first direction (X-axis direction), and the data lines DL may be formed parallel to each other in the second direction (Y-axis direction) intersecting the first direction (X-axis direction).

Each of the pixels P may be connected to at least one of the scan lines SL and one of the data lines DL. Each of the pixels P may include thin film transistors including a driving transistor and at least one switching transistor, a light-emitting element, and a capacitor. When a scan signal is applied from the scan line SL, each of the pixels P may receive a data voltage of the data line DL and may supply a driving current to the light-emitting element in response to the data voltage applied to a gate electrode to emit light. It has been mainly described that the light-emitting element is an organic light-emitting element including an anode, an organic light-emitting layer, and a cathode, but the present disclosure is not limited thereto. The light-emitting element may be implemented as, for example, a quantum dot light-emitting element including an anode, a quantum dot light-emitting layer, and a cathode, an inorganic light-emitting element including an anode, an inorganic light-emitting layer including an inorganic semiconductor, and a cathode, or a micro light-emitting element including a micro light-emitting diode.

The scan driver SD is connected to the display driving circuit 200 through a plurality of scan control lines SCL. Therefore, the scan driver SD may receive the scan control signals of the display driving circuit 200. The scan driver SD generates scan signals in response to the scan control signals and supplies the scan signals to the scan lines SL.

In FIG. 6, the scan driver SD is illustrated as being formed in the non-display area NDA outside a left side of the display area DA, but the present disclosure is not limited thereto. For example, the scan driver SD may be formed in the non-display area NDA outside left and right sides of the display area DA.

The display driving circuit 200 is connected to the display pads DP and receives digital video data and timing signals. The display driving circuit 200 converts the digital video data into analog positive/negative data voltages and supplies the analog positive/negative data voltages to the data lines DL through the fan-out lines DLL. Furthermore, the display driving circuit 200 generates and supplies scan control signals for controlling the scan driver SD through the plurality of scan control lines SCL. The pixels P to which the data voltages are supplied are selected by the scan signals of the scan driver SD, and the data voltages are supplied to the selected pixels P. The display driving circuit 200 may be formed as an IC and may be attached onto the substrate SUB through, for example, a chip on glass (COG) method, a chip on plastic (COP) method, or an ultrasonic bonding method, but the present disclosure is not limited thereto. For example, the display driving circuit 200 may be mounted on the circuit board 300.

As shown in FIG. 6, the display panel 100 may include the display pads DP electrically connected to the display driving circuit 200 and sensing pads TP1 and TP2 electrically connected to the sensing lines. A display pad area DPA in which the display pads DP are disposed may be disposed between a first sensing pad area TPA1 in which first sensing pads TP1 are disposed and a second sensing pad area TPA2 in which second sensing pads TP2 are disposed. As shown in FIG. 6, the display pad area DPA may be disposed at a center of one end of the protrusion area PA, the first sensing pad area TPA1 may be disposed at a left side of the one end of the protrusion area PA, and the second sensing pad area TPA2 may be disposed at a right side of the one end of the protrusion area PA.

The circuit board 300 may be attached onto the display pads DP and the sensing pads TP1 and TP2 using an anisotropic conductive film. Thus, the lead lines of the circuit board 300 may be electrically connected to the display pads DP and the sensing pads TP1 and TP2. The circuit board 300 may be, for example, a flexible printed circuit board (FPCB), a printed circuit board (PCB), or a flexible film such as a chip-on film (COF).

The touch driving circuit 400 may be connected to the sensing electrodes of the sensing unit of the display panel 100. The touch driving circuit 400 applies driving signals to the sensing electrodes and measures mutual electrostatic capacitances (hereinafter, referred to as "mutual capacitances") of the sensing electrodes. The driving signal may be a signal having a plurality of driving pulses. The touch driving circuit 400 may calculate touch coordinates at which a touch is input based on mutual capacitances.

The touch driving circuit 400 may be disposed on the circuit board 300. The touch driving circuit 400 may be formed as an IC and mounted on the circuit board 300.

FIG. 7 is a plan view illustrating components related to the sensing unit TDU of FIG. 5.

For convenience of description, only sensing electrodes RE and TE, conductive patterns DE, sensing lines TL and RL, and the sensing pads TP1 and TP2 are shown in FIG. 7.

Referring to FIG. 7, the sensing unit TDU includes the sensing area TSA for sensing a touch of a user and a sensing peripheral area TPA disposed around the sensing area TSA. The sensing area TSA may overlap the display area DA of the display unit DU, and the sensing peripheral area TPA may overlap the non-display area NDA of the display unit DU.

The sensing electrodes RE and TE may be disposed in the sensing area TSA. The sensing electrodes RE and TE may include first sensing electrodes RE and second sensing electrodes TE. In the exemplary embodiment shown in FIG. 7, it will be mainly described that the first sensing electrode RE is a sensing electrode and the second sensing electrode TE is a driving electrode.

The first sensing electrodes RE may be disposed in a plurality of rows in the first direction (X-axis direction) and may be electrically connected to one another. The second sensing electrodes TE may be disposed in a plurality of columns in the second direction (Y-axis direction) intersecting the first direction (X-axis direction) and may be electrically connected to one another. In FIG. 7, each of the first sensing electrodes RE and the second sensing electrodes TE is illustrated as having a rhombus planar shape, but the planar shape of each of the first sensing electrodes RE and the second sensing electrodes TE is not limited thereto.

The first sensing electrodes RE and the second sensing electrodes TE may be electrically separated from each other. The first sensing electrodes RE and the second sensing electrodes TE may be spaced apart from each other.

A size of each of the first sensing electrodes RE and a size of each of the second sensing electrodes TE may be substantially the same.

The conductive patterns DE may be electrically separated from the first sensing electrodes RE and the second sensing electrodes TE. That is, the conductive patterns DE may be spaced apart from the first sensing electrodes RE and the second sensing electrodes TE. The conductive patterns DE may be surrounded by each of the first sensing electrodes RE and the second sensing electrodes TE.

Parasitic capacitances between the second electrode of the light-emitting element layer EML and the first sensing electrodes RE or the second sensing electrodes TE may be reduced due to the conductive patterns DE. When the parasitic capacitances are reduced, a charging speed at which mutual capacitances between the first sensing electrodes RE and the second sensing electrodes TE are charged may be increased.

The sensing lines RL and TL may extend from the sensing peripheral area TPA and may be disposed in the sensing area TSA. The sensing lines RL and TL may include first sensing lines RL connected to the first sensing electrodes RE and second sensing lines TL connected to the second sensing electrodes TE. In the exemplary embodiment shown in FIG. 7, it will be mainly described that the first sensing line RL is a sensing line and the second sensing line TL is a driving line.

First end portions of the first sensing lines RL may be electrically connected to the first sensing electrodes RE, and second end portions of the first sensing lines RL may be connected to the first sensing pads TP1.

The first sensing lines RL may extend from the sensing peripheral area TPA in which the first sensing pads TP1 are disposed and may be disposed in the sensing area TSA. The first sensing lines RL may be electrically connected to the first sensing electrodes RE in the sensing area TSA. The first sensing lines RL may extend in the sensing area TSA in the second direction (Y-axis direction).

The first sensing lines RL may be electrically connected to one of the first sensing electrodes RE disposed in each row. For example, as shown in FIG. 7, the first sensing lines RL may be electrically connected to the first sensing electrode RE disposed in a first column of a first row and the first sensing electrode RE disposed in a second column of a second row.

First end portions of the second sensing lines TL may be electrically connected to the second sensing electrodes TE, and second end portions of the second sensing lines TL may be connected to the second sensing pads TP2.

The second sensing lines TL may extend to an edge of the sensing area TSA from the sensing peripheral area TPA in which the second sensing pads TP2 are disposed. The second sensing lines TL may be electrically connected to the second sensing electrodes TE at the edge of the sensing area TSA.

The second sensing lines TL may be electrically connected to one of the second sensing electrodes TE disposed in each column. For example, as shown in FIG. 7, the second sensing lines TL may be electrically connected to the second sensing electrodes TE disposed at a lower end among the second sensing electrodes TE electrically connected in the second direction (Y-axis direction).

The first sensing line RL may intersect the second sensing line TL and overlap the second sensing line TL in a thickness direction thereof.

According to the exemplary embodiment shown in FIG. 7, the first sensing lines RL may be disposed in the sensing area TSA overlapping the display area DA. Accordingly, since a space for arranging the first sensing lines RL is unnecessary in the sensing peripheral area TPA, the non-display area NDA of the display device 10 may be reduced.

Figure 8:
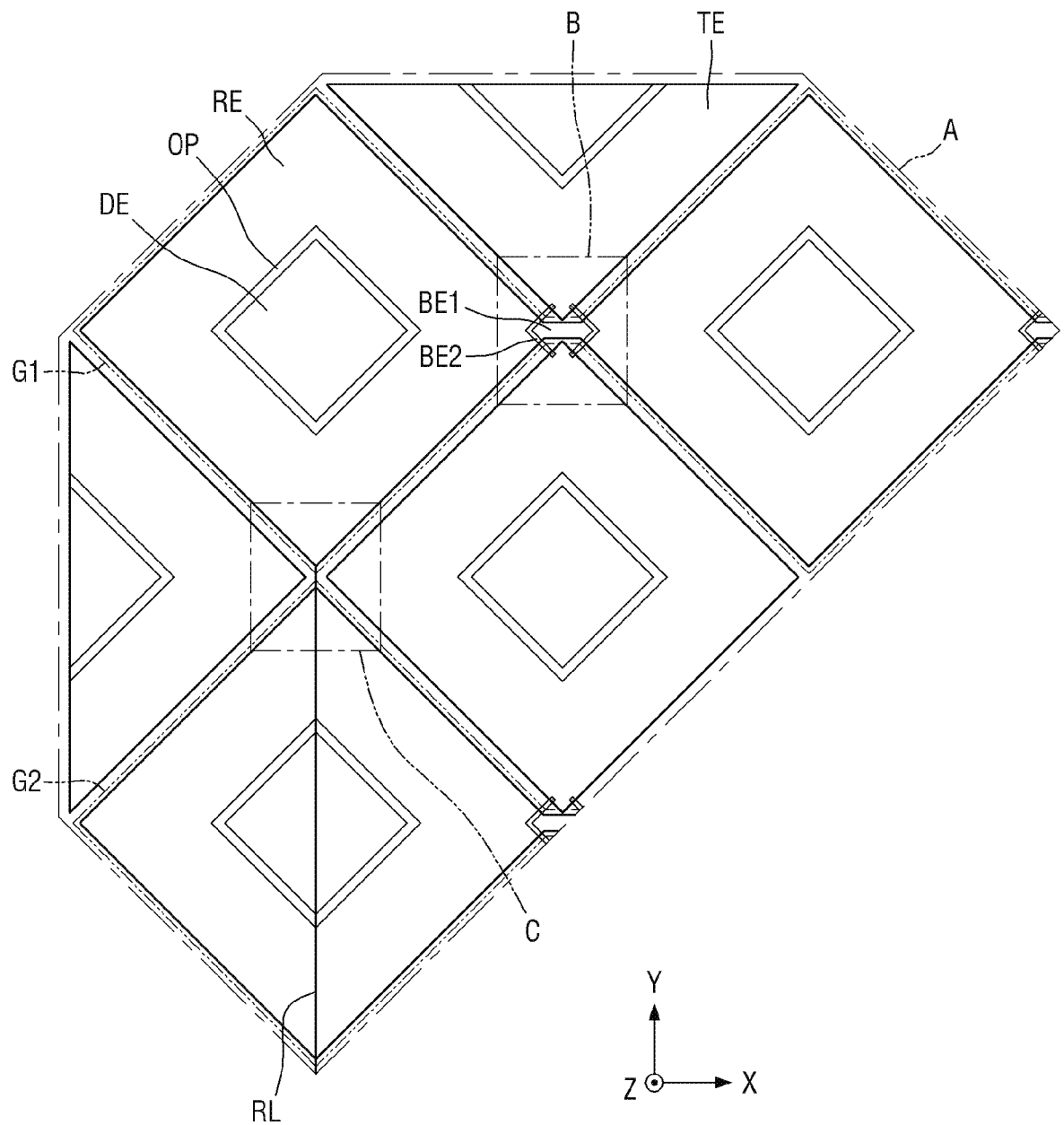
FIG. 8 is an enlarged view of region A of FIG. 7.

FIG. 8 is an enlarged view of region A of FIG. 7.

Referring to FIG. 8, in order for the first sensing electrodes RE and the second sensing electrodes TE to be electrically separated from each other in intersection regions thereof, the first sensing electrodes RE adjacent to each other in the first direction (X-axis direction) may be connected through a first connection portion BE1, and the second sensing electrodes TE adjacent to each other in the second direction (Y-axis direction) may be connected through second connection portions BE2.

The first connection portion BE1 may have a shape that extends from the first sensing electrodes RE. The first connection portion BE1 may be disposed on the same layer as the first sensing electrodes RE.

Figure 9:
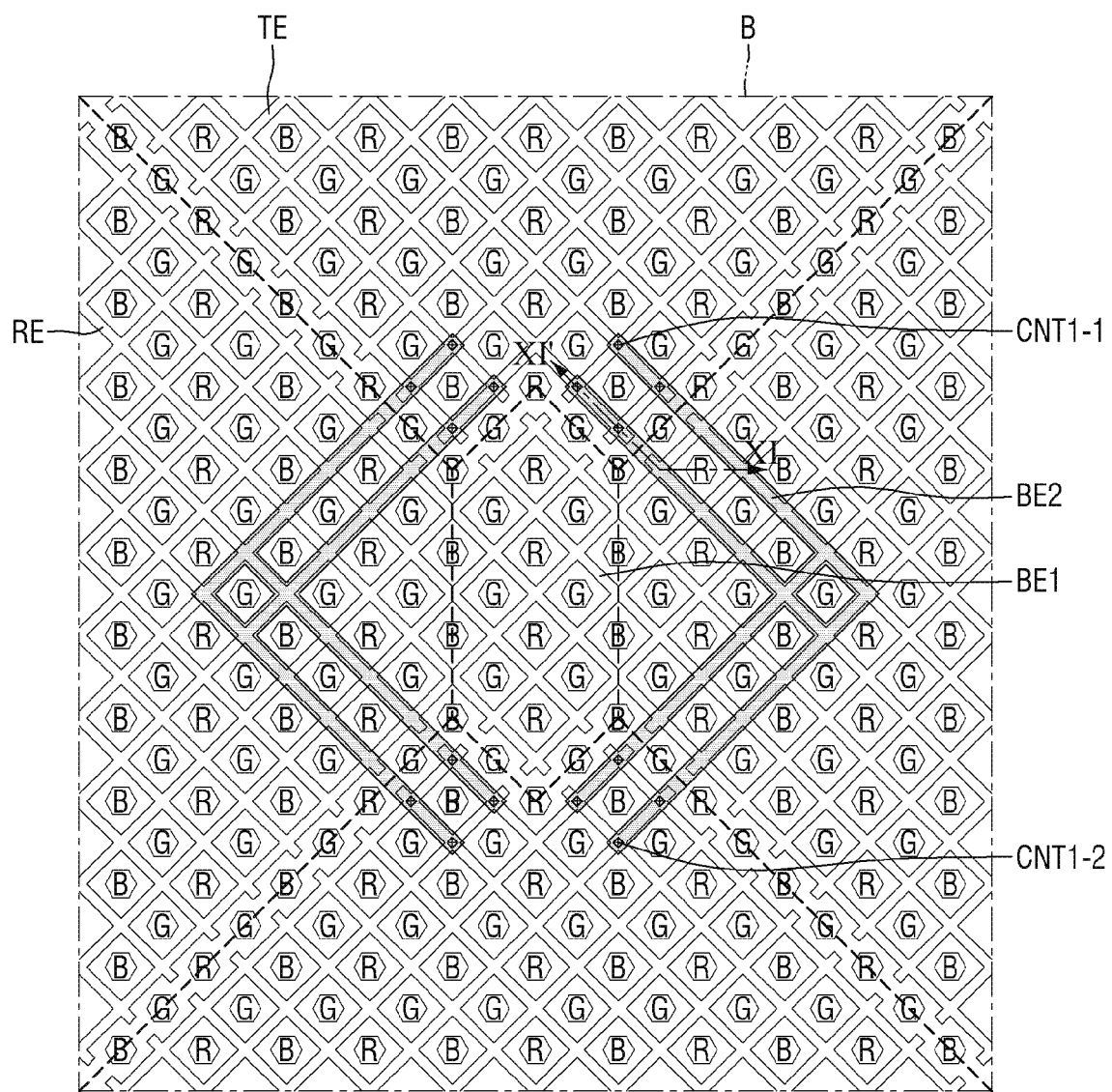
FIG. 9 is an enlarged view of region B of FIG. 8.

The second connection portion BE2 may be connected to the second sensing electrodes TE through first contact holes CNT1, which include 1-$1^{st}$ contact holes CNT1-1 and 1-$2^{nd}$ contact hole CNT1-2 (see FIG. 9). The second connection portions BE2 may have shapes that are bent at least once. In FIG. 8, the second connection portions BE2 are illustrated as being bent in a shape such as "<" or ">", but the shape of the second connection portions BE2 is not limited thereto. In addition, since the second sensing electrodes TE adjacent to each other in the second direction (Y-axis direction) are connected through a plurality of second connection portions BE2, even when one of the second connection portions BE2 is disconnected, the second sensing electrodes TE adjacent to each other in the second direction (Y-axis direction) may be stably connected. In FIG. 8, the second sensing electrodes TE adjacent to each other are illustrated as being connected through two second connection portions BE2, but the number of the second connection portions BE2 used to implement such a connection is not limited to two. In an exemplary embodiment, the second connection portion BE2 may be disposed on the same layer as the first sensing line RL. For example, in an exemplary embodiment, the second connection portion BE2 and the first sensing line RL may be disposed on the thin film encapsulation layer TFEL (see FIGS. 11 and 12).

The conductive patterns DE may be electrically separated from the first sensing electrodes RE and the second sensing electrodes TE. Each of the conductive patterns DE may be surrounded by each of the first sensing electrodes RE and the second sensing electrodes TE. Openings OP may be formed between the conductive patterns DE, and the first sensing electrodes RE and the second sensing electrodes TE. In this case, each of the conductive patterns DE may be surrounded by the opening OP, and each of the first sensing electrodes RE and the second sensing electrodes TE may be disposed to surround the opening OP.

A size of each of the conductive patterns DE may be smaller than a size of each of the first sensing electrodes RE and the second sensing electrodes TE. A conductive pattern DE may overlap the first sensing line RL in a thickness direction thereof. In FIG. 8, each of the first sensing electrodes RE, the second sensing electrodes TE, and the conductive patterns DE is illustrated as having a rhombus planar shape, but the planar shape of each of the first sensing electrodes RE, the second sensing electrodes TE, and the conductive patterns DE is not limited thereto.

According to the exemplary embodiment shown in FIG. 8, the first sensing electrodes RE adjacent to each other in the first direction (X-axis direction) may be connected through the first connection portion BE1, and the second sensing electrodes TE adjacent to each other in the second direction (Y-axis direction) may be connected through the second connection portions BE2. Therefore, the first sensing electrodes RE and the second sensing electrodes TE may be electrically separated from each other in the intersection regions thereof, the first sensing electrodes RE may be electrically connected in the first direction (X-axis direction), and the second sensing electrodes TE may be electrically connected in the second direction (Y-axis direction).

FIG. 9 is an enlarged view of region B of FIG. 8.

Referring to FIG. 9, the first sensing electrodes RE, the second sensing electrodes TE, the first connection portion BE1, and the second connection portions BE2 may have a mesh shape or a net shape. The conductive patterns DE may also have a mesh shape or a net shape.

When the sensing layer TSL including the first sensing electrodes RE and the second sensing electrodes TE is disposed directly on the thin film encapsulation layer TFEL as shown in FIG. 5, a distance between the second electrode of the light-emitting element layer EML and each of the first sensing electrodes RE and the second sensing electrodes TE of the sensing layer TSL may be small. Accordingly, a very high parasitic capacitance may be formed between the second electrode of the light-emitting element layer EML and each of the first sensing electrodes RE and the second sensing electrodes TE of the sensing layer TSL. The parasitic capacitance is proportional to an overlapping area between the second electrode of the light emitting element layer EML and each of the first sensing electrodes RE and the second sensing electrodes TE of the sensing layer TSL. Thus, in order to reduce the parasitic capacitance, each of the first sensing electrodes RE and the second sensing electrodes TE may have a mesh shape or a net shape.

That is, the first sensing electrodes RE, the second sensing electrodes TE, and the conductive patterns DE may be spaced apart from each other. Gaps may be present between the first sensing electrode RE and the second sensing electrode TE, between the first sensing electrode RE and the conductive pattern DE, between the second sensing electrode TE and the conductive pattern DE, and between the second sensing electrode TE and the first connection portion BE1. In FIG. 9, for convenience of description, a boundary between the first sensing electrode RE and the second sensing electrode TE, a boundary between the second sensing electrode TE and the first connection portion BE1, and a boundary between the first sensing electrode RE and the first connection portion BE1 are illustrated by dotted lines.

The first connection portion BE1 may be disposed between the first sensing electrodes RE. The first connection portion BE1 may extend from each of the first sensing electrodes RE. Therefore, the first connection portion BE1 may be connected to the first sensing electrodes RE without a separate contact hole.

The second connection portion BE2 may be connected to each of the second sensing electrodes TE through the first contact holes CNT1. One end portion of the second connection portion BE2 may be connected to one second sensing electrode TE of the second sensing electrodes TE adjacent to each other in the second direction (Y-axis direction) through a 1-1$^{st}$ contact hole CNT1-1. The other end portion of the second connection portion BE2 may be connected to the other second sensing electrode TE of the second sensing electrodes TE adjacent to each other in the second direction (Y-axis direction) through a 1-2$^{nd}$ contact hole CNT1-2.

The second connection portion BE2 may overlap the first sensing electrode RE or the second sensing electrode TE. Alternatively, the second connection portion BE2 may overlap the first connection portion BE1 instead of the first sensing electrode RE. Alternatively, the second connection portion BE2 may overlap both of the first sensing electrode RE and the first connection portion BE1. The second connection portion BE2 may be disposed on a layer different from the first connection portion BE1. Therefore, according to exemplary embodiments, even when the second connection portion BE2 overlaps the first connection portion BE1, the second connection portion BE2 is not short-circuited to the first connection portion BE1.

The first sensing electrodes RE, the second sensing electrodes TE, the first connection portion BE1, and the second connection portions BE2 may be disposed such that they do not overlap each of subpixels R, G, and B. That is, the first sensing electrodes RE, the second sensing electrodes TE, the first connection portion BE1, and the second connection portions BE2 may be disposed along an edge of each of the subpixels R, G, and B. That is, the first sensing electrodes RE, the second sensing electrodes TE, the first connection portion BE1, and the second connection portions BE2 may be disposed to overlap a pixel definition layer configured to define each of the subpixels R, G, and B.

The subpixels R, G, and B may include a first subpixel R emitting first color light, a second subpixel G emitting second color light, and a third subpixel B emitting third color light. FIG. 9 illustrates that the first subpixel R is a red subpixel, the second subpixel G is a green subpixel, and the third subpixel B is a blue subpixel, but the present disclosure is not limited thereto. In FIG. 9, the first subpixel R, the second subpixel G, and the third subpixel B are illustrated as having a hexagonal planar shape, but the present disclosure is not limited thereto. The first subpixel R, the second subpixel G, and the third subpixel B may have another shape other than a hexagonal shape such as, for example, a polygonal, circular, or elliptical planar shape. In addition, in FIG. 9, a size of the first subpixel R, a size of the second subpixel G, and a size of the third subpixel B are illustrated as being substantially the same, but the sizes of the subpixels R, G, and B are not limited thereto. For example, the size of the third subpixel B may be the largest, and the size of the second subpixel G may be the smallest. Alternatively, the size of the first subpixel R and the size of the third subpixel B may be substantially the same, and the size of the second subpixel G may be smaller than each of the size of the first subpixel R and the size of the third subpixel B.

The pixel P refers to a group of subpixels capable of expressing a grayscale. In FIG. 9, the pixel P is illustrated as including one first subpixel R, two second subpixels G, and one third subpixel B, but the present disclosure is not limited thereto. For example, the pixel P may include one first subpixel R, one second subpixel G, and one third subpixel B.

According to the exemplary embodiment shown in FIG. 9, since the first sensing electrodes RE, the second sensing electrodes TE, the first connection portion BE1, and the second connection portions BE2 have a mesh shape or a net shape, the subpixels R, G, and B do not overlap the first sensing electrodes RE, the second sensing electrodes TE, the first connection portion BE1, and the second connection portions BE2. Therefore, light output from the subpixels R, G, and B may be blocked by the first sensing electrodes RE, the second sensing electrodes TE, the first connection portion BE1, and the second connection portions BE2, thereby preventing luminance of the light from being reduced.

Figure 10:
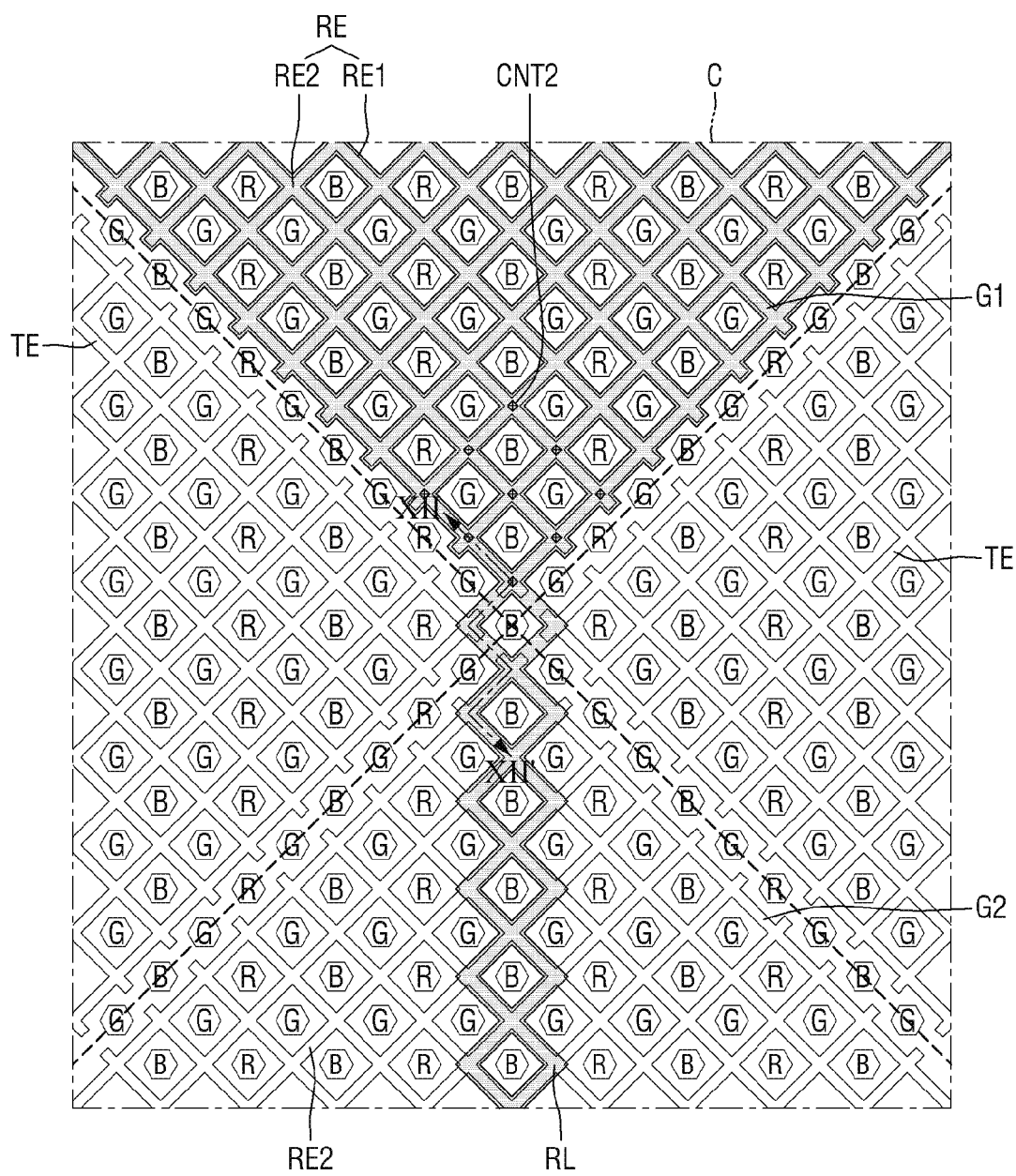
FIG. 10 is an enlarged view of region C of FIG. 8.

FIG. 10 is an enlarged view of region C of FIG. 8.

Referring to FIG. 10, the first sensing electrodes RE may include first layer electrodes RE1 and second layer electrodes RE2. The second layer electrodes RE2 may be disposed on the first layer electrodes RE1.

The first layer electrodes RE1 of the first sensing electrodes RE may be disposed in a part of a plurality of rows, and the second layer electrodes RE2 may be disposed in all of the plurality of rows.

For example, as shown in FIGS. 8 to 10, the first sensing electrodes RE disposed in a first row are defined as a first group G1, and the first sensing electrodes RE disposed in a second row may be defined as a second group G2. The first group G1 and the second group G2 may be spaced apart from each other. The first layer electrode RE1 of the first group G1 may be disposed in a part of a first column. That is, the first layer electrode RE1 of the first group G1 may be disposed to overlap the second layer electrode RE2 disposed in the first column in a thickness direction thereof. In addition, the first layer electrode RE1 of the first group G1 may be disposed such that it does not overlap the second layer electrodes RE2 disposed in the remaining columns except for the first column of the first group G1. Furthermore, the first layer electrode RE1 of the first group G1 may be disposed such that it does not overlap the second layer electrodes RE2 of the second group G2.

FIG. 10 illustrates a case in which the first layer electrode RE1 of the first group G1 entirely overlaps the second layer electrode RE2 disposed in the first column, but the present disclosure is not limited thereto. That is, the first layer electrode RE1 of the first group G1 may be disposed to overlap one of the second layer electrodes RE2 disposed in other columns such as a second column.

The first layer electrode RE1 may be connected to the above-described first sensing line RL. Thus, one of the first sensing electrodes RE of the first group G1 may be electrically connected to the first sensing line RL. The first sensing line RL may have a shape that extends from one end of the first layer electrode RE1. The first sensing line RL may extend from the first layer electrode RE1 to the first sensing pad TP1 disposed in the sensing peripheral area TPA. In this case, the first sensing line RL may partially overlap the first sensing electrode RE or the second sensing electrode TE, which is disposed in the sensing area TSA. For example, as shown in FIG. 10, the first sensing line RL connected to the first layer electrode RE1 of the first group G1 may overlap the first sensing electrode RE of the second group G2 in a thickness direction thereof. That is, the first sensing line RL connected to the first layer electrode RE1 of the first group G1 may overlap the second layer electrode RE2 of the second group G2.

The first layer electrode RE1 of each group may be electrically connected to the second layer electrode RE2 of each group through second contact holes CNT2. That is, the first layer electrode RE1 may serve to connect the first sensing line RL and the first sensing electrode RE of each group. For example, the first layer electrode RE1 of the first group G1 may connect the first sensing line RL and the first sensing electrodes RE of the first group G1. In addition, the first layer electrode RE1 of the second group G2 may connect the first sensing line RL and the first sensing electrodes RE of the second group G2. FIG. 10 illustrates a case in which the second contact holes CNT2 are partially formed in one side, i.e., a lower side of the first layer electrode RE1, but the present disclosure is not limited thereto. That is, the second contact holes CNT2 may be formed in an entire region in which the first layer electrode RE1 and the second layer electrode RE2 overlap each other.

The first layer electrode RE1 may be disposed on the same layer as the first sensing line RL. For example, in an exemplary embodiment, the first layer electrode RE1 and the first sensing line RL may be directly disposed on the thin film encapsulation layer TFEL (see FIG. 12). The first layer electrode RE1 and the first sensing line RL may be made of the same material. For example, the first layer electrode RE1 may be formed of a first sensing conductive layer 171 shown in FIG. 12. FIG. 10 illustrates a case in which the first sensing line RL is connected to the second layer electrode RE2 through the first layer electrode RE1, but the present disclosure is not limited thereto. That is, the first layer electrode RE1 of the first sensing electrode RE may be omitted, and the first sensing line RL may be connected directly to the second layer electrode RE2. In this case, the second layer electrode RE2 may be connected directly to the first sensing line RL through a contact hole passing through an insulating layer disposed thereunder.

The first layer electrode RE1 may have a mesh shape or a net shape. In an exemplary embodiment, since the first layer electrode RE1 has the mesh shape or the net shape, the subpixels R, G, and B do not overlap the first layer electrode RE1. Therefore, as described above, light output from the subpixels R, G, and B may be blocked by the first layer electrode RE1, thereby preventing luminance of the light from being reduced.

Figure 11:
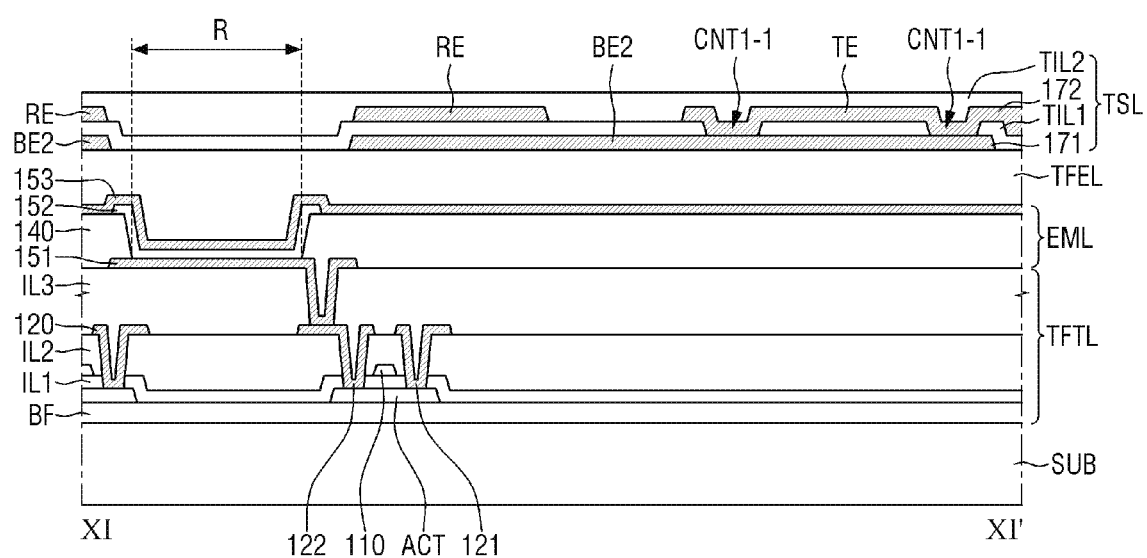
FIG. 11 is a cross-sectional view taken along line XI-XI' of FIG. 9.
Figure 12:
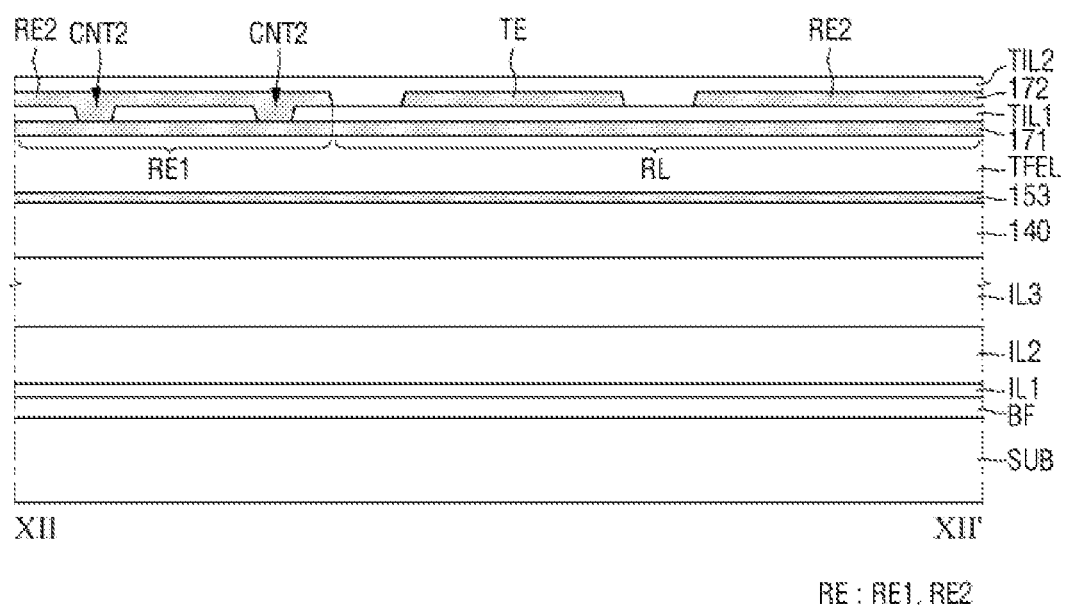
FIG. 12 is a cross-sectional view taken along line XII-XII' of FIG. 10.

FIG. 11 is a cross-sectional view taken along line XI-XI' of FIG. 9. FIG. 12 is a cross-sectional view taken along line XII-XII' of FIG. 10.

A connection structure between the second sensing electrode TE and the second connection portion BE2 is shown in line XI-XI' of FIG. 9. A connection structure between the first layer electrode RE1 of the first sensing electrode RE, the second layer electrode RE2 thereof, and/or the first sensing line RL is shown in line XII-XII' of FIG. 10.

Referring to FIGS. 11 and 12, the thin film transistor layer TFTL is disposed on the substrate SUB. The thin film transistor layer TFTL includes a buffer layer BF, a semiconductor layer ACT, a first insulating layer IL1, a first conductive layer 110, a second insulating layer IL2, a second conductive layer 120, and a third insulating layer IL3. Each of the above-described layers may be formed as a single layer but may also be formed as a stacked layer including a plurality of layers. Other layers may be further disposed between the respective layers.

The buffer layer BF may be formed on one surface of the substrate SUB. The buffer layer BF may be formed on one surface of the substrate SUB to protect the thin film transistors and a light-emitting layer 152 of the light-emitting element layer EML from moisture permeating through the substrate SUB, which is vulnerable to moisture transmission. The buffer layer BF may include a plurality of inorganic layers which are alternately stacked. For example, the buffer layer BF may be formed as a multilayer in which one or more inorganic layers among, for example, a silicon nitride layer, a silicon oxynitride layer, a silicon oxide layer, a titanium oxide layer, and an aluminum oxide layer are alternately stacked. In an exemplary embodiment, the buffer layer BF may be omitted.

The semiconductor layer ACT is disposed on the buffer layer BF. The semiconductor layer ACT constitutes channels of a plurality of transistors of the pixels. The semiconductor layer ACT may include polycrystalline silicon. Polycrystalline silicon may be formed by crystallizing amorphous silicon.

When the semiconductor layer ACT is made of polycrystalline silicon and is doped with ions, the ion-doped semiconductor layer ACT may have conductivity. As a result, the semiconductor layer ACT may include not only channel regions of the plurality of transistors, but also source and drain regions. The source region and the drain region may be connected to both sides of each channel region.

In an exemplary embodiment, the semiconductor layer ACT may include, for example, single crystalline silicon, low temperature polycrystalline silicon, amorphous silicon, or an oxide semiconductor. For example, the oxide semiconductor may include a binary compound ($AB_x$), a ternary compound ($AB_xC_y$), or a quaternary compound ($AB_xC_yD_z$), which includes, for example, indium, zinc, gallium, tin, titanium, aluminum, hafnium (Hf), zirconium (Zr), magnesium (Mg), or the like. In an exemplary embodiment, the semiconductor layer ACT may include ITZO (an oxide including indium, tin, and zinc) or IGZO (an oxide including indium, gallium, and zinc).

The first insulating layer IL1 is disposed on the semiconductor layer ACT. The first insulating layer IL1 may be substantially disposed on the entire surface of the substrate SUB. The first insulating layer IL1 may be a gate insulating film having a gate insulating function. The first insulating layer IL1 may include, for example, a silicon compound, a metal oxide, or the like. For example, the first insulating layer IL1 may include silicon oxide, silicon nitride, silicon oxynitride, aluminum oxide, tantalum oxide, hafnium oxide, zirconium oxide, titanium oxide, or the like. The first insulating layer IL1 may be a single layer or may be a multi-layer including stacked films made of different materials.

The first conductive layer 110 is disposed on the first insulating layer IL1. The first conductive layer 110 may include at least one metal selected from among, for example, molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The first conductive layer 110 may be a single layer or a multilayer. The first conductive layer 110 may include a gate electrode of a transistor and a first electrode of a storage capacitor.

The second insulating layer IL2 is disposed on the first conductive layer 110. The second insulating layer IL2 may be substantially disposed on the entire surface of the substrate SUB. The second insulating layer IL2 serves to insulate the first conductive layer 110 from the second conductive layer 120.

The second insulating layer IL2 may be an interlayer insulating layer. The second insulating layer IL2 may include the same material as the above-described first insulating layer IL1, or may include at least one material selected from among the materials exemplified as the constituent materials of the first insulating layer IL1.

The second conductive layer 120 is disposed on the second insulating layer IL2. The second conductive layer 120 may include at least one metal selected from, for example, aluminum (Al), molybdenum (Mo), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The second conductive layer 120 may be a single layer or a multilayer. For example, the second conductive layer 120 may be formed to have a stacked structure of Ti/Al/Ti, Mo/Al/Mo, Mo/Al/germanium (Ge)/Mo, Ti/Cu, or the like. The second conductive layer 120 may include the above-described data lines, a source electrode 121, and a drain electrode 122. The source electrode 121 and the drain electrode 122 may be connected to the source region and the drain region of the semiconductor layer ACT through contact holes passing through the second insulating layer IL2 and the first insulating layer IL1, respectively.

The third insulating layer IL3 covers the second conductive layer 120. The third insulating layer IL3 may be a via layer. The third insulating layer IL3 may include an organic insulating material such as, for example, a polyacrylate-based resin, an epoxy resin, a phenolic resin, a polyamide-based resin, a polyimide-based resin, an unsaturated polyester-based resin, a polyphenylenether-based resin, a polyphenylene sulfide-based resin, or benzocyclobutene (BCB).

The light-emitting element layer EML is disposed on the thin film transistor layer TFTL. The light emitting element layer EML may include a first electrode layer 151, the light-emitting layer 152, a second electrode layer 153, and a pixel definition layer 140.

Each of the subpixels R, G, and B refers to a region in which the first electrode layer 151, the light-emitting layer 152, and the second electrode layer 153 are sequentially stacked, and holes generated from the first electrode layer 151 and electrons generated from the second electrode layer 153 are combined with each other in the light-emitting layer 152 to emit light. The second subpixel G and the third subpixel B may have substantially the same configuration as the first subpixel R shown in FIG. 11.

The first electrode layer 151 may be disposed on the third insulating layer IL3. The first electrode layer 151 may have, but is not limited to, a stacked layer structure formed by stacking a material layer having a high work function and a reflective material layer, in which the material layer is made of at least one selected from among, for example, indium tin oxide (ITO), indium zinc oxide (IZO), zinc oxide (ZnO), and indium oxide (In2O3), and the reflective material layer is made of one selected from among silver (Ag), magnesium (Mg), aluminum (Al), platinum (Pt), lead (Pb), gold (Au), nickel (Ni), neodymium (Nd), iridium (Jr), chromium (Cr), lithium (Li), calcium (Ca), and a mixture thereof. The material layer having a high work function may be disposed on the reflective material layer and may be disposed close to the light-emitting layer 152. The first electrode layer 151 may have a multilayer structure of, for example, ITO/Mg, ITO/MgF, ITO/Ag, or ITO/Ag/ITO, but the present disclosure is not limited thereto. An anode of the subpixels R, G, and B may be formed of the first electrode layer 151. FIG. 11 illustrates a case in which the anode is connected to the drain electrode 122 through a contact hole passing through the third insulating layer IL3, but the present disclosure is not limited thereto. That is, the anode may also be connected to the source electrode 121 through a contact hole passing through the third insulating layer IL3.

The pixel definition layer 140 may be disposed on the first electrode layer 151. In order to serve to define the subpixels R, G, and B, the pixel definition layer 140 may be formed to partition the first electrode layer 151 on the third insulating layer IL3. The pixel definition layer 140 may include an opening that exposes the first electrode layer 151. That is, the pixel definition layer 140 may be formed to cover an edge of the first electrode layer 151. The opening may define an emission area of each of the subpixels R, G, and B.

The pixel definition layer 140 may include an inorganic insulating material such as, for example, silicon oxide, silicon nitride, silicon oxynitride, hafnium oxide, aluminum oxide, titanium oxide, tantalum oxide, or zinc oxide, or an organic insulating material such as, for example, a polyacrylate-based resin, an epoxy resin, a phenolic resin, a polyamide-based resin, a polyimide-based resin, an unsaturated polyester-based resin, a polyphenylenether-based resin, a polyphenylene sulfide-based resin, or BCB. The pixel definition layer 140 may be a single layer or a multilayer including stacked layers made of different materials.

The light-emitting layer 152 is disposed in the opening of the pixel definition layer 140. The light-emitting layer 152 may include an organic material to emit certain color light. For example, the light-emitting layer 152 may include a hole transport layer, an organic material layer, and an electron transport layer. In this case, the light-emitting layer 152 of the red subpixel R may emit red light, the light-emitting layer 152 of the green subpixel G may emit green light, and the light-emitting layer 152 of the blue subpixel B may emit blue light.

Alternatively, the light-emitting layers 152 of the subpixels R, G, and B may be formed as one layer to emit white light, ultraviolet light, or blue light. In this case, the red subpixel R may overlap a red color filter layer which transmits red light, the green subpixel G may overlap a green color filter layer which transmits green light, and the blue subpixel B may overlap a blue color filter layer which transmits blue light. The red color filter layer, the green color filter layer, and the blue color filter layer may be disposed on the thin film encapsulation layer TFEL. In addition, the red subpixel R may overlap a red wavelength conversion layer which converts ultraviolet light or blue light into red light, the green subpixel G may overlap a green wavelength conversion layer which converts ultraviolet light or blue light into green light, and the blue subpixel B may overlap a blue wavelength conversion layer which converts ultraviolet light or blue light into blue light. The red wavelength conversion layer, the green wavelength conversion layer, and the blue wavelength conversion layer may be disposed on the thin film encapsulation layer TFEL. For example, the red wavelength conversion layer may be disposed between the thin film encapsulation layer TFEL and the red color filter layer, the green wavelength conversion layer may be disposed between the thin film encapsulation layer TFEL and the green color filter layer, and the blue wavelength conversion layer may be disposed between the thin film encapsulation layer TFEL and the blue color filter layer.

The second electrode layer 153 is disposed on the light-emitting layer 152 and the pixel definition layer 140. A cathode may be formed of the second electrode layer 153. The cathode may be disposed over the entire display area DA. The second electrode layer 153 may include a material layer having a low work function such as, for example, Li, Ca, LiF/Ca, LiF/Al, Al, Mg, Ag, Pt, Pd, Ni, Au, Nd, Jr, Cr, BaF, Ba, or a compound or mixture thereof (for example, a mixture of Ag and Mg). The second electrode layer 153 may further include a transparent metal oxide layer disposed on the material layer having a low work function. A capping layer may be formed on the second electrode layer 153.

The thin film encapsulation layer TFEL may be disposed on the light-emitting element layer EML. The thin film encapsulation layer TFEL is disposed on the second electrode layer 153. The thin film encapsulation layer TFEL may include at least one inorganic layer so as to prevent oxygen or moisture from permeating into the light-emitting layer 152 and the second electrode layer 153. In addition, the thin film encapsulation layer TFEL may include at least one organic layer so as to protect the light-emitting element layer EML from foreign substances such as dust. For example, the thin film encapsulation layer TFEL may include a first inorganic layer disposed on the second electrode layer 153, an organic layer disposed on the first inorganic layer, and a second inorganic layer disposed on the organic layer. The first inorganic layer and the second inorganic layer may be formed of, for example, a silicon nitride layer, a silicon oxynitride layer, a silicon oxide layer, a titanium oxide layer, or an aluminum oxide layer, but the present disclosure is not limited thereto. The organic layer may be made of, for example, an acryl resin, an epoxy resin, a phenolic resin, a polyamide resin, a polyimide resin, or the like, but the present disclosure is not limited thereto.

The sensing layer TSL may be disposed on the thin film encapsulation layer TFEL. A buffer layer may be further formed between the thin film encapsulation layer TFEL and the sensing layer TSL.

The sensing layer TSL may include the first sensing conductive layer 171, a first sensing insulating layer TIL1, a second sensing conductive layer 172, and a second sensing insulating layer TIL2.

Each of the above-described layers may be formed as a single layer, but may also be formed as a stacked layer including a plurality of layers. Other layers may be further disposed between the respective layers.

The first sensing conductive layer 171 may include one selected from among, for example, molybdenum, titanium, copper, aluminum, and an alloy thereof. The first sensing conductive layer 171 may include the first layer electrode RE1 of the first sensing electrode RE, the first sensing line RL, and the second connection portion BE2, which are described above.

The first sensing insulating layer TIL1 may be disposed on the first sensing conductive layer 171.

The first sensing insulating layer TIL1 insulates the first sensing conductive layer 171 from the second sensing conductive layer 172. The first sensing insulating layer TIL1 may include an organic layer and/or an inorganic layer. For example, the organic layer may include at least one selected from among an acrylic-based resin, a methacryl-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin. For example, the inorganic layer may include at least one selected from among aluminum oxide, titanium oxide, silicon oxide, silicon oxynitride, zirconium oxide, and hafnium oxide.

The second sensing conductive layer 172 may be disposed on the first sensing insulating layer TIL1. The second sensing conductive layer 172 may include the same material as the above-described first sensing conductive layer 171, or may include at least one material selected from among the materials exemplified as the constituent materials of the first sensing conductive layer 171. The second sensing conductive layer 172 may include the second layer electrode RE2 of the first sensing electrode RE, the second sensing electrode TE, and the first connection portion BE1, which are described above.

The second layer electrode RE2 of the first sensing electrode RE may be connected to the first layer electrode RE1 of the first sensing electrode RE through the second contact holes CNT2 passing through the first sensing insulating layer TIL1. Accordingly, the second layer electrode RE2 of the first sensing electrode RE may be connected to the first sensing line RL through the first layer electrode RE1.

The second sensing electrode TE may be connected to the second connection portion BE2 through the 1-$1^{st}$ contact hole CNT1-1 passing through the first sensing insulating layer TIL1. Accordingly, the second sensing electrodes TE adjacent to each other in the second direction (Y-axis direction) may be connected through the second connection portions BE2.

The second sensing insulating layer TIL2 may be disposed on the second sensing conductive layer 172. The second sensing insulating layer TIL2 may serve to planarize a stepped portion formed due to the first sensing conductive layer 171 and the second sensing conductive layer 172. The second sensing insulating layer TIL2 may include the same material as the above-described first sensing insulating layer TIL1, or may include at least one material selected from among the materials exemplified as the constituent materials of the first sensing insulating layer TIL1.

According to the exemplary embodiment shown in FIGS. 1 to 12, the first sensing line RL may be connected to the first sensing electrodes RE disposed in each group through the first layer electrode RE1. In this case, the first sensing line RL may extend from one end of the first layer electrode RE1 and be disposed in the sensing area TSA. Accordingly, since a space for arranging the first sensing lines RL is unnecessary in the sensing peripheral area TPA, the non-display area NDA of the display device 10 may be reduced.

In the following exemplary embodiments, the same components as the above-described components will be denoted by the same reference numerals, and repetitive descriptions thereof will be omitted or simplified.

Figure 13:
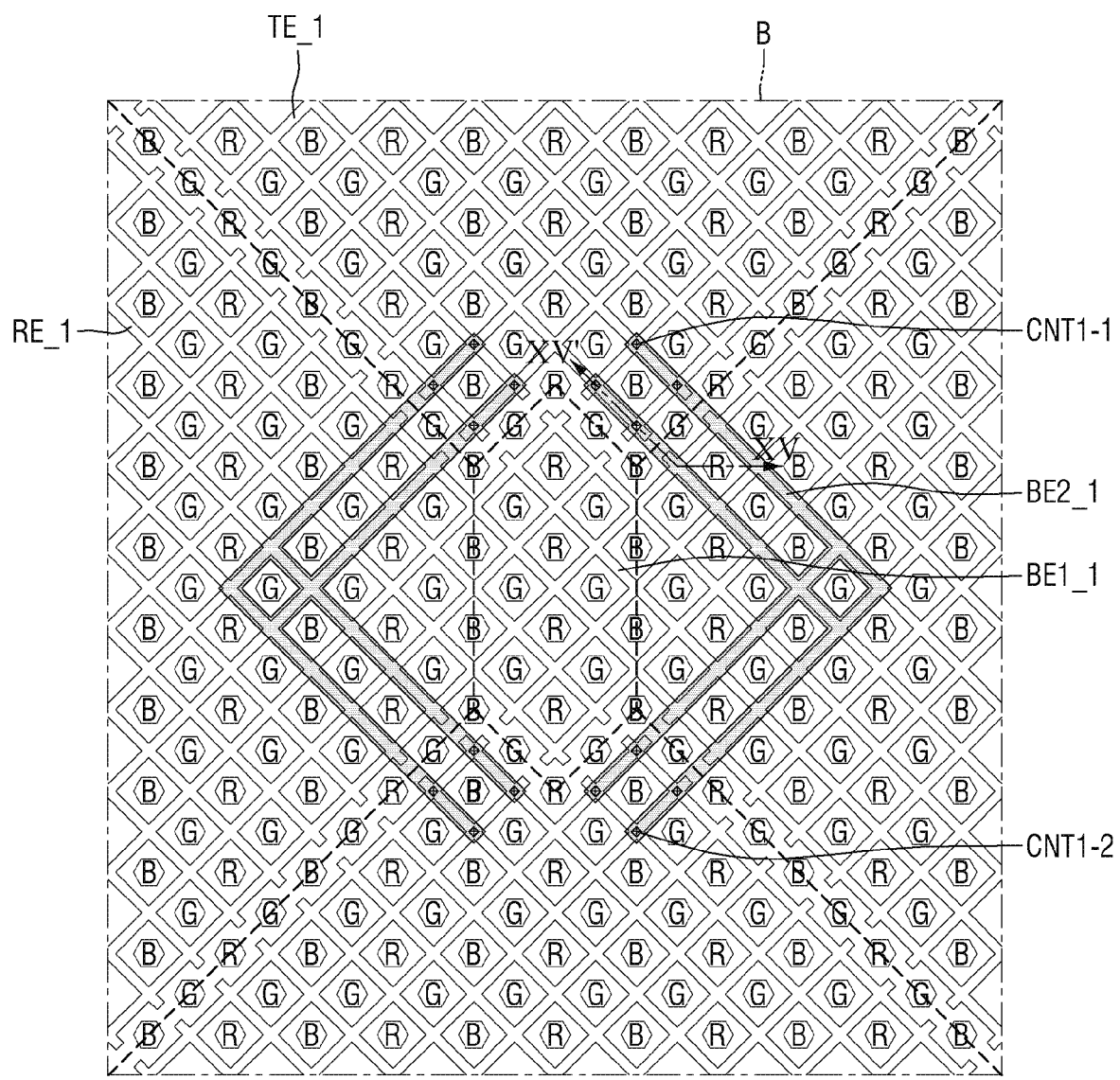
FIGS. 13 and 14 are enlarged views of a sensing layer according to an exemplary embodiment.
Figure 14:
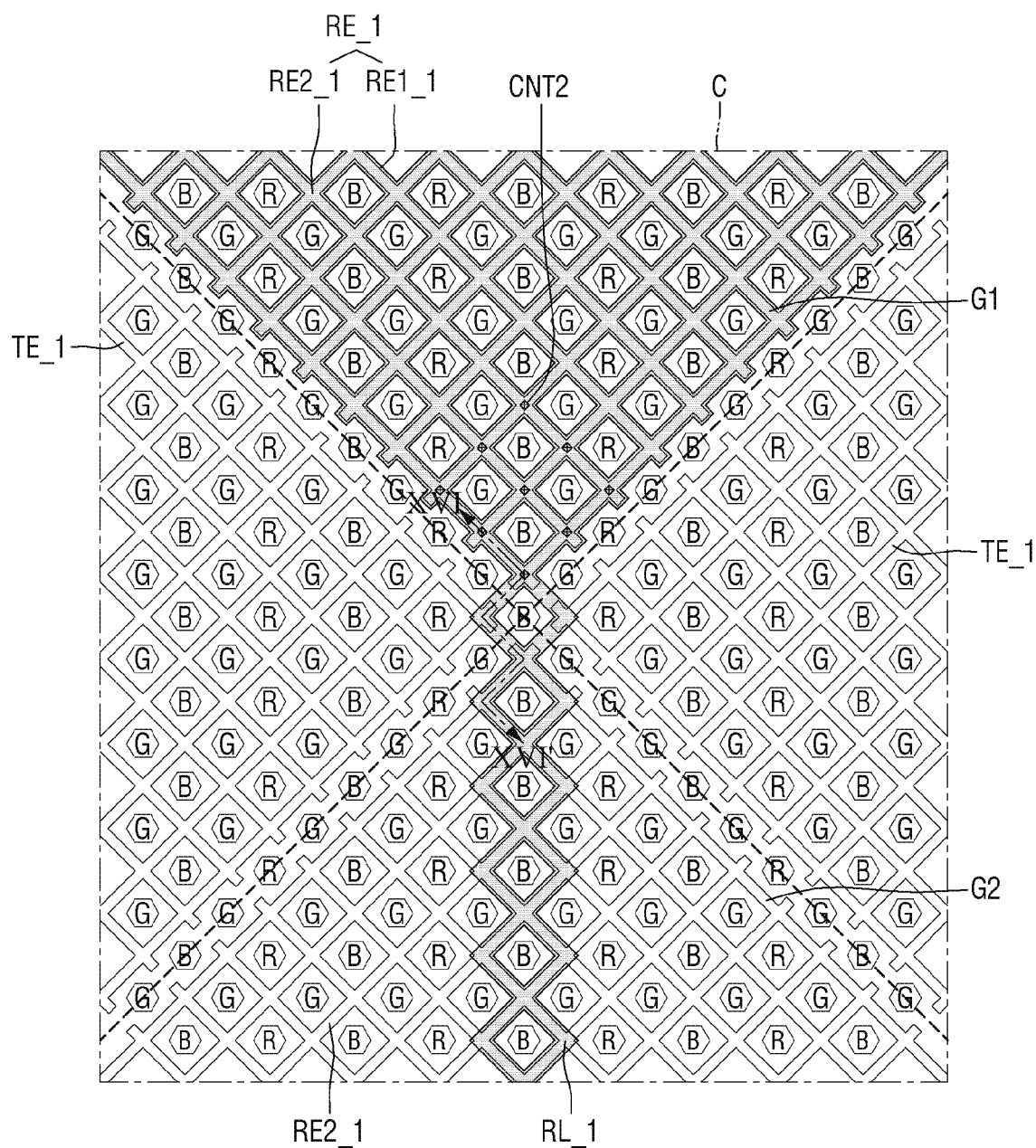
Figure 15:
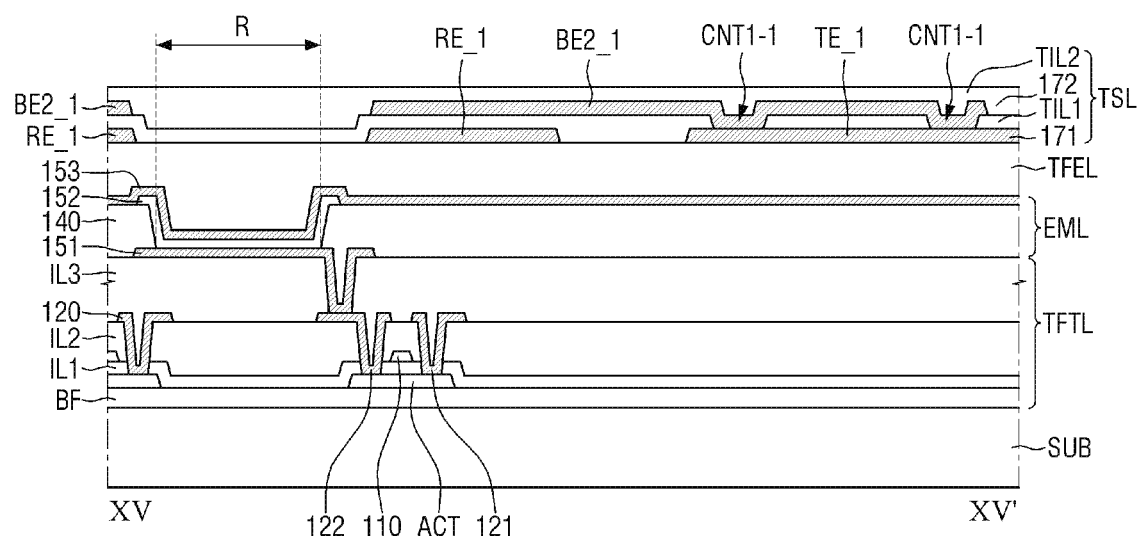
FIG. 15 is a cross-sectional view taken along line XV-XV' of FIG. 13.
Figure 16:
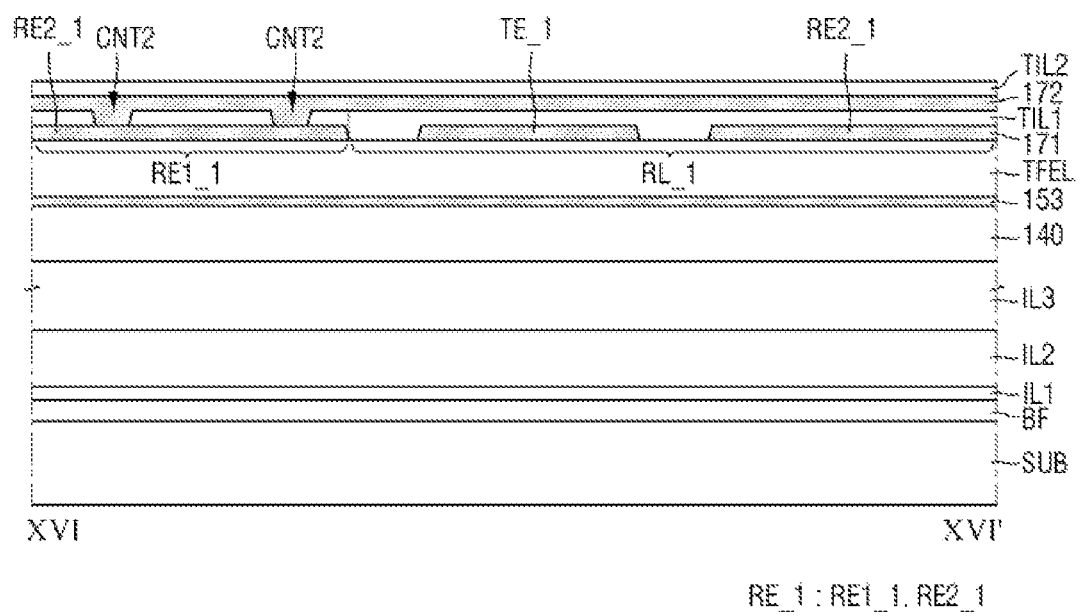
FIG. 16 is a cross-sectional view taken along line XVI-XVI' of FIG. 14.

FIGS. 13 and 14 are enlarged views of a sensing layer according to an exemplary embodiment. FIG. 15 is a cross-sectional view taken along line XV-XV' of FIG. 13. FIG. 16 is a cross-sectional view taken along line XVI-XVI' of FIG. 14.

FIG. 13 is an enlarged view of a region that is substantially the same as region B of FIG. 8, and FIG. 14 is an enlarged view of a region that is substantially the same as region C of FIG. 8.

Referring to FIGS. 13 to 16, interlayer components constituting the sensing layer of an exemplary embodiment are different from those of the exemplary embodiment of FIGS. 1 to 12.

For example, second layer electrodes RE2_1 of first sensing electrodes RE_1 and second sensing electrodes TE_1 may be formed of a first sensing conductive layer 171.

The first sensing electrodes RE_1 may be disposed in a plurality of rows in a first direction (X-axis direction) and electrically connected through a first connection portion BE1_1. The first connection portion BE1_1 may be disposed on the same layer as the second layer electrode RE2_1 of the first sensing electrode RE_1. That is, the first connection portion BE1_1 may be formed of the first sensing conductive layer 171. The first connection portion BE1_1 may have a shape that extends from the second layer electrodes RE2_1 of the first sensing electrodes RE_1.

The second sensing electrodes TE_1 may be disposed in a plurality of columns in a second direction (Y-axis direction) and electrically connected through second connection portions BE2_1. The second connection portions BE2_1 may be disposed on a layer different from the second sensing electrodes TE_1. The second connection portion BE2_1 may be connected to the second sensing electrodes TE_1 through first contact holes CNT1-1. For example, the second connection portion BE2_1 may be formed of a second sensing conductive layer 172 and may be connected to the second sensing electrodes TE_1 formed of the first sensing conductive layer 171 through the first contact holes CNT1-1 passing through a first sensing insulating layer TIL1.

One end portion of the second connection portion BE2_1 may be connected to one second sensing electrode TE_1 of the second sensing electrodes TE_1 adjacent to each other in the second direction (Y-axis direction) through a 1-1$^{st}$ contact hole CNT1-1. The other end portion of the second connection portion BE2_1 may be connected to the other second sensing electrode TE_1 of the second sensing electrodes TE_1 adjacent to each other in the second direction (Y-axis direction) through a 1-2$^{nd}$ contact hole CNT1-2.

A first sensing line RL_1 may be formed of the second sensing conductive layer 172. The first sensing line RL_1 may be connected to a first layer electrode RE1_1 of the first sensing electrode RE_1. The first sensing line RL_1 may have a shape that extends from one end of the first layer electrode RE1_1. The first sensing line RL_1 may extend from the first layer electrode RE1_1 to a first sensing pad TP1 disposed in a sensing peripheral area TPA.

The first layer electrode RE1_1 may be disposed on the same layer as the first sensing line RL_1. The first layer electrode RE1_1 may be electrically connected to the second layer electrode RE2_1 through second contact holes CNT2. For example, the first layer electrode RE1_1 may be formed of the second sensing conductive layer 172 and may be connected to the second layer electrode RE2_1 through the second contact holes CNT2 passing through the first sensing insulating layer TIL1. Accordingly, the first layer electrode RE1_1 may serve to connect the first sensing line RL_1 and the first sensing electrode RE_1 disposed in each row.

Since other detailed descriptions of the first sensing electrode RE_1, the second sensing electrode TE_1, the first connection portion BE1_1, the second connection portion BE2_1, and the first sensing line RL_1 have been given with reference to FIGS. 1 to 12, a repetitive description will be omitted.

According to the exemplary embodiment shown in FIGS. 13 to 16, the first sensing line RL_1 may be connected to the first sensing electrodes RE_1 disposed in each row through the first layer electrode RE1_1. The first sensing line RL_1 may extend from one end of the first layer electrode RE1_1 and be disposed in a sensing area TSA. Accordingly, since a space for arranging the first sensing lines RL_1 is unnecessary in the sensing peripheral area TPA, a non-display area NDA of a display device 10 may be reduced.

Figure 17:
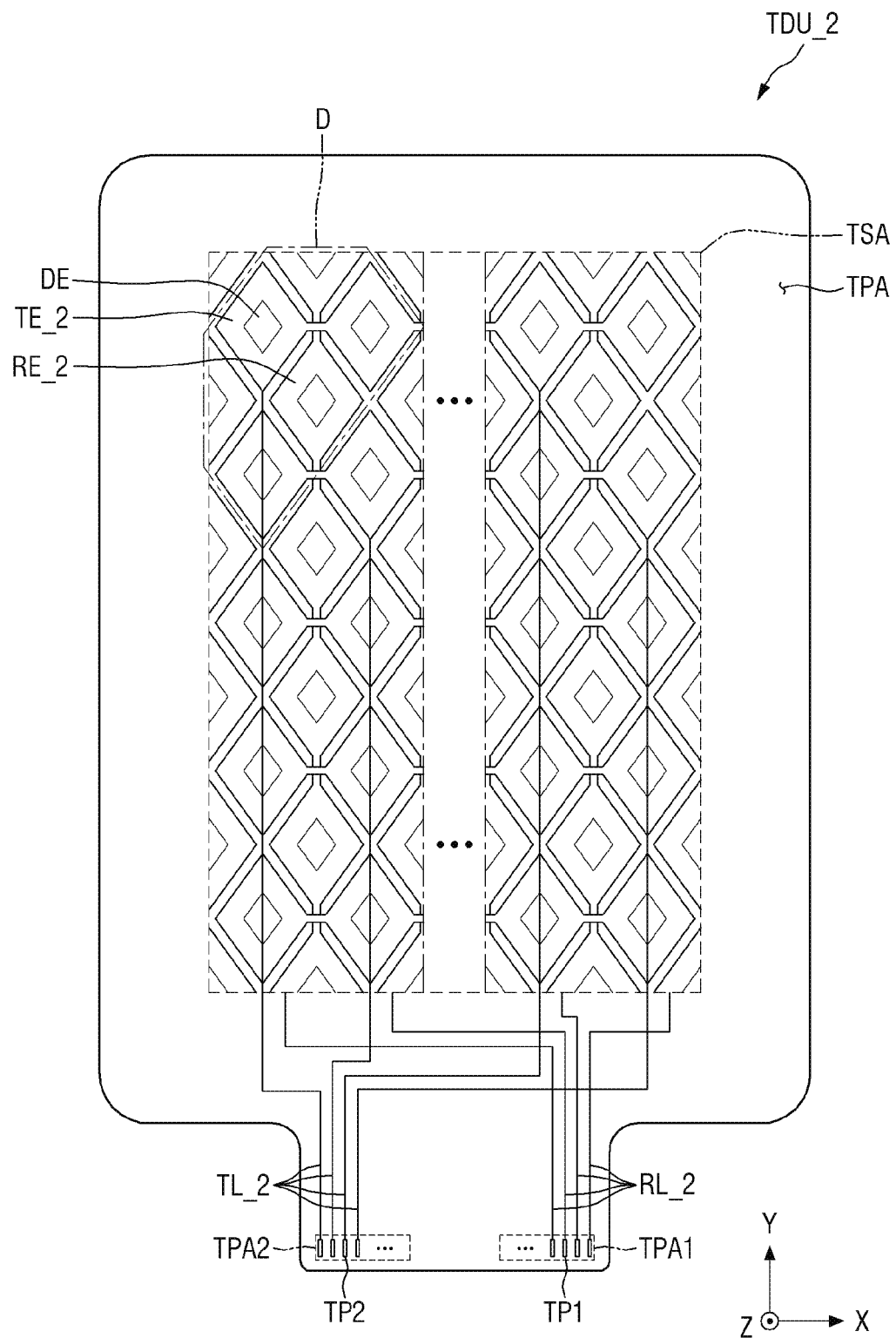
FIG. 17 is a plan view illustrating components related to a sensing unit according to an exemplary embodiment.

FIG. 17 is a plan view illustrating components related to a sensing unit according to an exemplary embodiment.

Referring to FIG. 17, an exemplary embodiment is different from the exemplary embodiment of FIGS. 1 to 12 in that, in a sensing unit TDU_2 according to an exemplary embodiment, first sensing electrodes RE_2 are disposed in a second direction (Y-axis direction) and second sensing electrodes TE_2 are disposed in a first direction (X-axis direction).

For convenience of description, only the sensing electrodes RE_2 and TE_2, conductive patterns DE, sensing lines RL_2 and TL_2, and sensing pads TP1 and TP2 are shown in FIG. 17.

Referring to FIG. 17, the first sensing electrodes RE_2 may be disposed in a plurality of columns in the second direction (Y-axis direction) intersecting the first direction (X-axis direction) and may be electrically connected to each other. The second sensing electrodes TE_2 may be disposed in a plurality of rows in the first direction (X-axis direction) and may be electrically connected to each other.

The first sensing electrodes RE_2 and the second sensing electrodes TE_2 may be electrically separated from each other. The first sensing electrodes RE_2 and the second sensing electrodes TE_2 may be spaced apart from each other.

Figure 18:
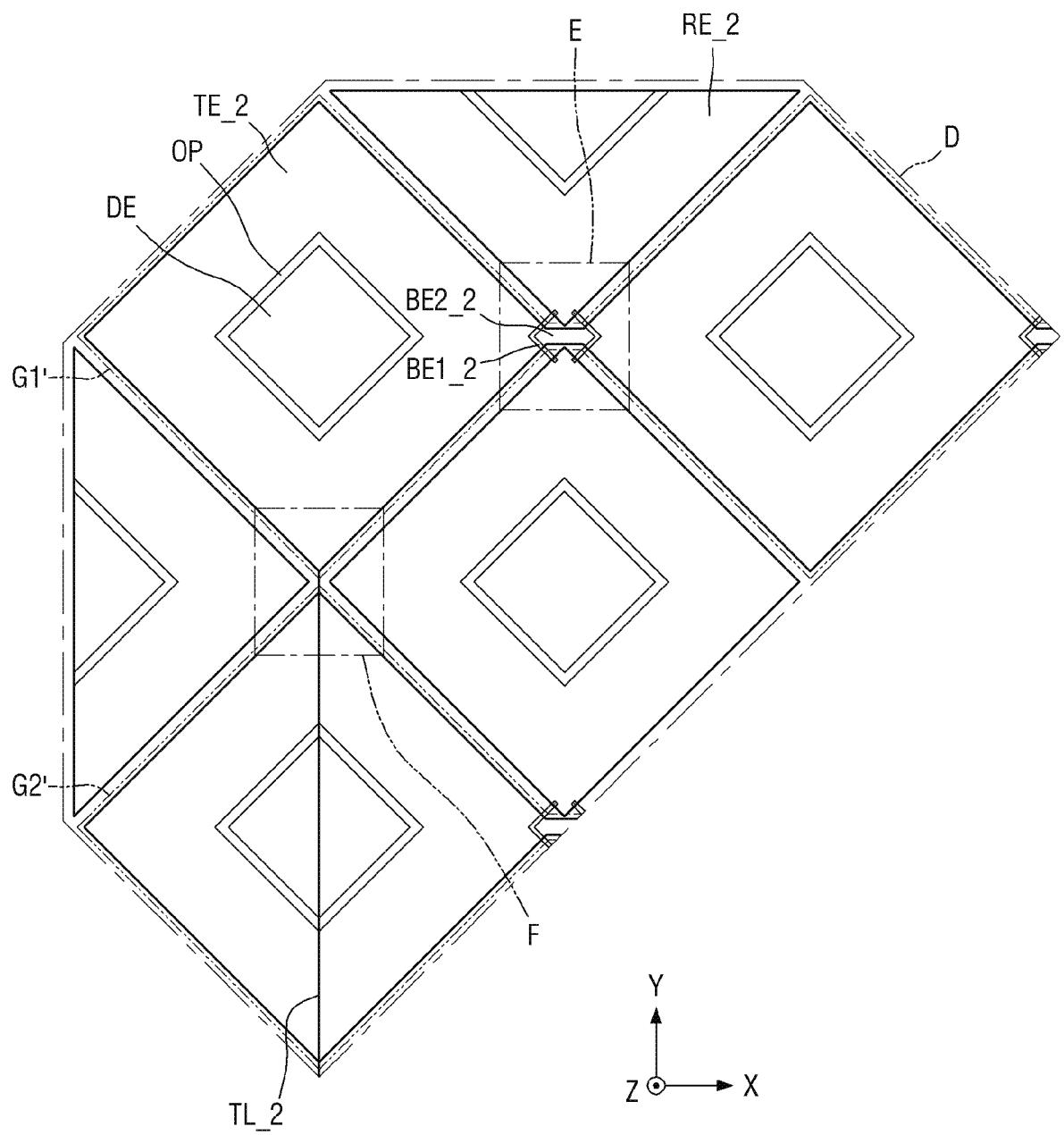
FIG. 18 is an enlarged view of region D of FIG. 17.

In order for the first sensing electrodes RE_2 and the second sensing electrodes TE_2 to be electrically separated in intersection regions thereof, the second sensing electrodes TE_2 adjacent to each other in the first direction (X-axis direction) are connected through a second connection portion BE2_2 (see FIG. 18), and the first sensing electrodes RE_2 adjacent to each other in the second direction (Y-axis direction) may be connected through first connection portions BE1_2 (see FIG. 18).

The conductive patterns DE may be electrically separated from the first sensing electrodes RE_2 and the second sensing electrodes TE_2. Openings OP may be formed between the conductive patterns DE, and the first sensing electrodes RE_2 and the second sensing electrodes TE_2 (see FIG. 18). The first sensing electrodes RE_2, the second sensing electrodes TE_2, and the conductive patterns DE may be spaced apart from each other. Each of the conductive patterns DE may be surrounded by the opening OP, and each of the first sensing electrodes RE and the second sensing electrodes TE may be disposed to surround the opening OP (see FIG. 18).

Parasitic capacitances between a second electrode of a light-emitting element layer EML and the first sensing electrodes RE_2 or the second sensing electrodes TE_2 may be reduced due to the conductive patterns DE. As described above, when the parasitic capacitances are reduced, a charging speed at which mutual capacitances between the first sensing electrodes RE_2 and the second sensing electrodes TE_2 are charged may be increased.

The sensing lines RL_2 and TL_2 may extend from a sensing peripheral area TPA and be disposed in a sensing area TSA. The sensing lines RL_2 and TL_2 may include first sensing lines RL_2 connected to the first sensing electrodes RE_2 and second sensing lines TL_2 connected to the second sensing electrodes TE_2. In the exemplary embodiment shown in FIG. 17, it will be mainly described that the first sensing line RL_2 is a sensing line and the second sensing line TL_2 is a driving line.

First end portions of the first sensing lines RL_2 may be electrically connected to the first sensing electrodes RE_2, and second end portions of the first sensing lines RL_2 may be connected to first sensing pads TP1.

The first sensing lines RL_2 may extend to an edge of the sensing area TSA from the sensing peripheral area TPA in which the first sensing pads TP1 are disposed. The first sensing lines RL_2 may be electrically connected to the first sensing electrodes RE_2 at the edge of the sensing area TSA.

The first sensing lines RL_2 may be electrically connected to one of the first sensing electrodes RE_2 disposed in each column. For example, as shown in FIG. 17, the first sensing lines RL_2 may be connected to the first sensing electrodes RE_2 disposed at a lower end among the first sensing electrodes RE_2 electrically connected in the second direction (Y-axis direction).

First end portions of the second sensing lines TL_2 may be electrically connected to the second sensing electrodes TE_2, and second end portions of the second sensing lines TL_2 may be connected to second sensing pads TP2.

The second sensing lines TL_2 may extend from the sensing peripheral area TPA in which the second sensing pads TP2 are disposed and may be disposed in the sensing area TSA. The second sensing lines TL_2 may be electrically connected to the second sensing electrodes TE_2 in the sensing area TSA. The second sensing lines TL_2 may extend in the sensing area TSA in the second direction (Y-axis direction).

The second sensing lines TL_2 may be electrically connected to one of the second sensing electrodes TE_2 disposed in each row. For example, as shown in FIG. 17, the second sensing lines TL_2 may be electrically connected to the second sensing electrode TE_2 disposed in a first column of a first row, the second sensing electrode TE_2 disposed in a second column of a second row, and the second sensing electrode TE_2 disposed in an $n^{th}$ column of an $n^{th}$ row, where n is a natural number.

According to the exemplary embodiment shown in FIG. 17, the second sensing line TL_2 may be disposed in the sensing area TSA overlapping a display area DA. Accordingly, since a space for arranging the second sensing lines TL_2 is unnecessary in the sensing peripheral area TPA, a non-display area NDA of a display device 10 may be reduced.

FIG. 18 is an enlarged view of region D of FIG. 17.

Referring to FIG. 18, the first sensing electrodes RE_2 may be disposed in the second direction (Y-axis direction) and electrically connected through the first connection portions BE1_2.

The second sensing electrodes TE_2 may be disposed in the first direction (X-axis direction) and electrically connected through the second connection portion BE2_2.

Figure 19:
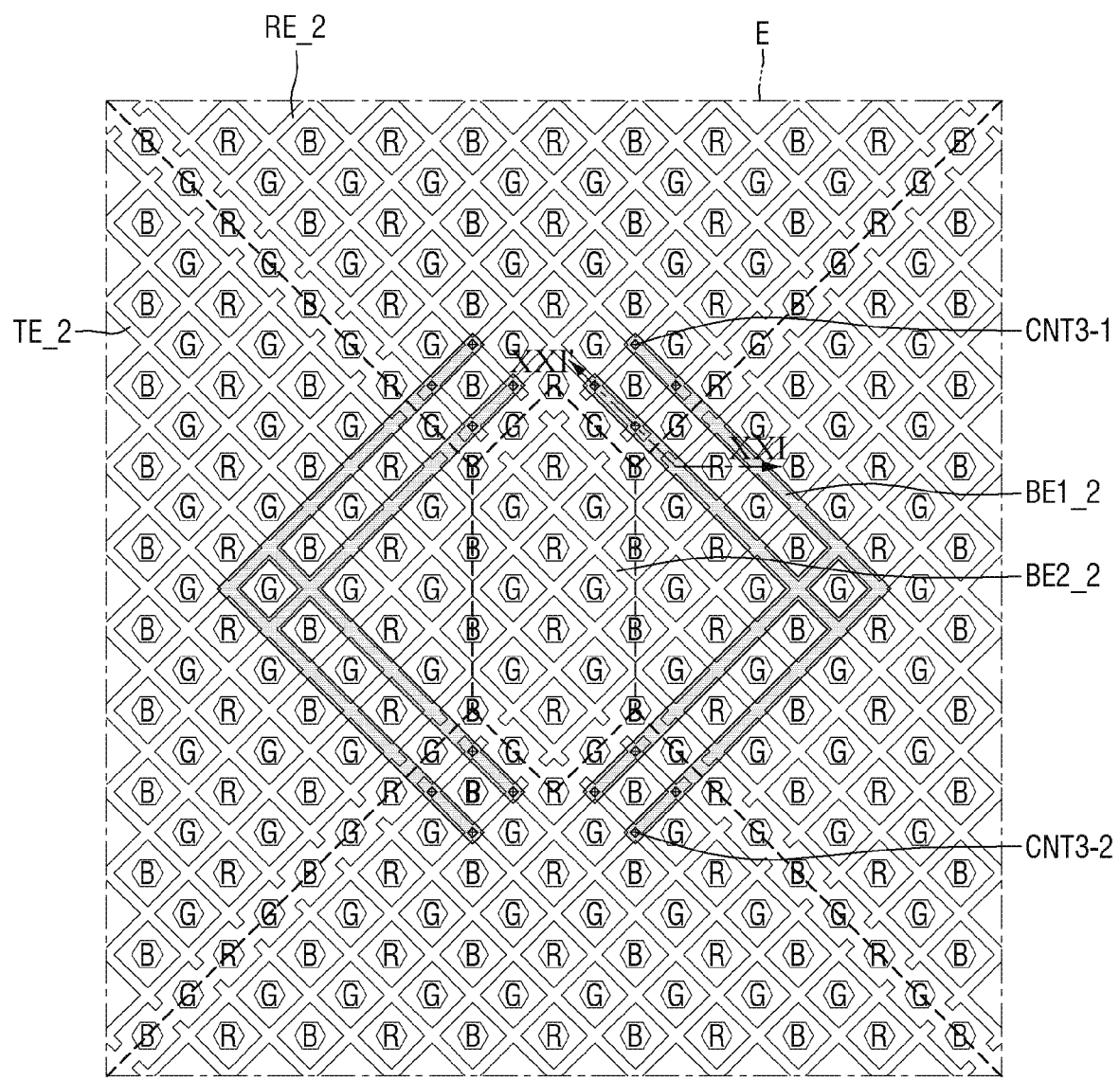
FIG. 19 is an enlarged view of region E of FIG. 18.

The first connection portion BE1_2 may be connected to the first sensing electrodes RE_2 through third contact holes CNT3, which include a 3-$1^{st}$ contact hole CNT3-1 and a 3-$2^{nd}$ contact hole CNT3-2 (see FIG. 19). The second connection portions BE1_2 may have shapes that are bent at least once. In FIG. 18, the first connection portions BE1_2 are illustrated as being bent in a shape such as "<" or ">", but the shape of the first connection portions BE1_2 is not limited thereto. In addition, since the first sensing electrodes RE_2 adjacent to each other in the second direction (Y-axis direction) are connected through a plurality of first connection portions BE1_2, even when one of the first connection portions BE1_2 is disconnected, the first sensing electrodes RE_2 adjacent to each other in the second direction (Y-axis direction) may be stably connected. In FIG. 18, the first sensing electrodes RE_2 adjacent to each other are illustrated as being connected through two first connection portions BE1_2, but the number of the first connection portions BE1_2 is not limited to two.

The second connection portion BE2_2 may have a shape that extends from the second sensing electrodes TE_2.

According to the exemplary embodiment shown in FIG. 18, the first sensing electrodes RE_2 adjacent to each other in the second direction (Y-axis direction) may be connected through the first connection portions BE1_2, and the second sensing electrodes TE_2 adjacent to each other in the first direction (X-axis direction) may be connected through the second connection portion BE2_2. Accordingly, the first sensing electrodes RE_2 and the second sensing electrodes TE_2 may be electrically separated from each other in the intersection regions thereof, the first sensing electrodes RE_2 may be electrically connected in the second direction (Y-axis direction), and the second sensing electrodes TE_2 may be electrically connected in the first direction (X-axis direction).

FIG. 19 is an enlarged view of region E of FIG. 18.

Referring to FIG. 19, the first sensing electrodes RE_2, the second sensing electrodes TE_2, the first connection portions BE1_2, and the second connection portion BE2_2 may have a mesh shape or a net shape. The conductive patterns DE may also have a mesh shape or a net shape.

When a sensing layer TSL including the first sensing electrodes RE_2 and the second sensing electrodes TE_2 is disposed directly on a thin film encapsulation layer TFEL, a distance between the second electrode of the light-emitting element layer EML and each of the first sensing electrodes RE_2 and the second sensing electrodes TE_2 of the sensing layer TSL may be small. That is, the second electrode of the light-emitting element layer EML and each of the first sensing electrodes RE_2 and the second sensing electrodes TE_2 of the sensing layer TSL may be close to one another. Accordingly, a very high parasitic capacitance may be formed between the second electrode of the light-emitting element layer EML and each of the first sensing electrodes RE_2 and the second sensing electrodes TE_2 of the sensing layer TSL. The parasitic capacitance is proportional to an overlapping area between the second electrode of the light emitting element layer EML and each of the first sensing electrodes RE_2 and the second sensing electrodes TE_2 of the sensing layer TSL. Thus, in order to reduce the parasitic capacitance, each of the first sensing electrodes RE_2 and the second sensing electrodes TE_2 may have a mesh shape or a net shape.

The first sensing electrodes RE_2, the second sensing electrodes TE_2, and the conductive patterns DE may be spaced apart from each other. Gaps may be present between the first sensing electrode RE_2 and the second sensing electrode TE_2, between the first sensing electrode RE_2 and the conductive pattern DE, between the second sensing electrode TE_2 and the conductive pattern DE, and between the first sensing electrode RE_2 and the second connection portion BE2_2. In FIG. 19, for convenience of description, a boundary between the first sensing electrode RE_2 and the second sensing electrode TE_2, a boundary between the first sensing electrode RE_2 and the second connection portion BE2_2, and a boundary between the second sensing electrode TE_2 and the second connection portion BE2_2 are illustrated by dotted lines.

The first connection portion BE1_2 may be connected to each of the first sensing electrodes RE_2 through the third contact holes CNT3. For example, one end portion of the first connection portion BE1_2 may be connected to one first sensing electrode RE_2 of the first sensing electrodes RE_2 adjacent to each other in the second direction (Y-axis direction) through a 3-$1^{st}$ contact hole CNT3-1. The other end portion of the first connection portion BE1_2 may be connected to the other first sensing electrode RE_2 of the first sensing electrodes RE_2 adjacent to each other in the second direction (Y-axis direction) through a 3-$2^{nd}$ contact hole CNT3-2.

The first connection portion BE1_2 may overlap the first sensing electrode RE_2 or the second sensing electrode TE_2. Alternatively, the first connection portion BE1_2 may overlap the second connection portion BE2_2 instead of the second sensing electrode TE_2. Alternatively, the first connection portion BE1_2 may overlap both of the second sensing electrode TE_2 and the second connection portion BE2_2. The first connection portion BE1_2 may be disposed on a layer different from the second sensing electrodes TE_2 and the second connection portion BE2_2. Therefore, in an exemplary embodiment, even when the first connection portion BE1_2 overlaps the second sensing electrode TE_2 or the second connection portion BE2_2, the first connection portion BE1_2 is not short-circuited to the second sensing electrode TE_2 or the second connection portion BE2_2.

The first sensing electrodes RE_2, the second sensing electrodes TE_2, the first connection portions BE1_2, and the second connection portion BE2_2 may be disposed such that they do not overlap each of subpixels R, G, and B. That is, the first sensing electrodes RE_2, the second sensing electrodes TE_2, the first connection portions BE1_2, and the second connection portion BE2_2 may be disposed along an edge of each of the subpixels R, G, and B. That is, the first sensing electrodes RE_2, the second sensing electrodes TE_2, the first connection portions BE1_2, and the second connection portion BE2_2 may be disposed to overlap a pixel definition layer configured to define each of the subpixels R, G, and B. Since the subpixels R, G, and B have been described with reference to FIG. 9, a repetitive description thereof will be omitted.

Since the first sensing electrodes RE_2, the second sensing electrodes TE_2, the first connection portions BE1_2, and the second connection portion BE2_2 have a mesh shape or a net shape, the subpixels R, G, and B do not overlap the first sensing electrodes RE_2, the second sensing electrodes TE_2, the first connection portions BE1_2, and the second connection portion BE2_2. Therefore, as described above, light output from the subpixels R, G, and B may be blocked by the first sensing electrodes RE_2, the second sensing electrodes TE_2, the first connection portions BE1_2, and the second connection portion BE2_2, thereby preventing luminance of the light from being reduced.

Figure 20:
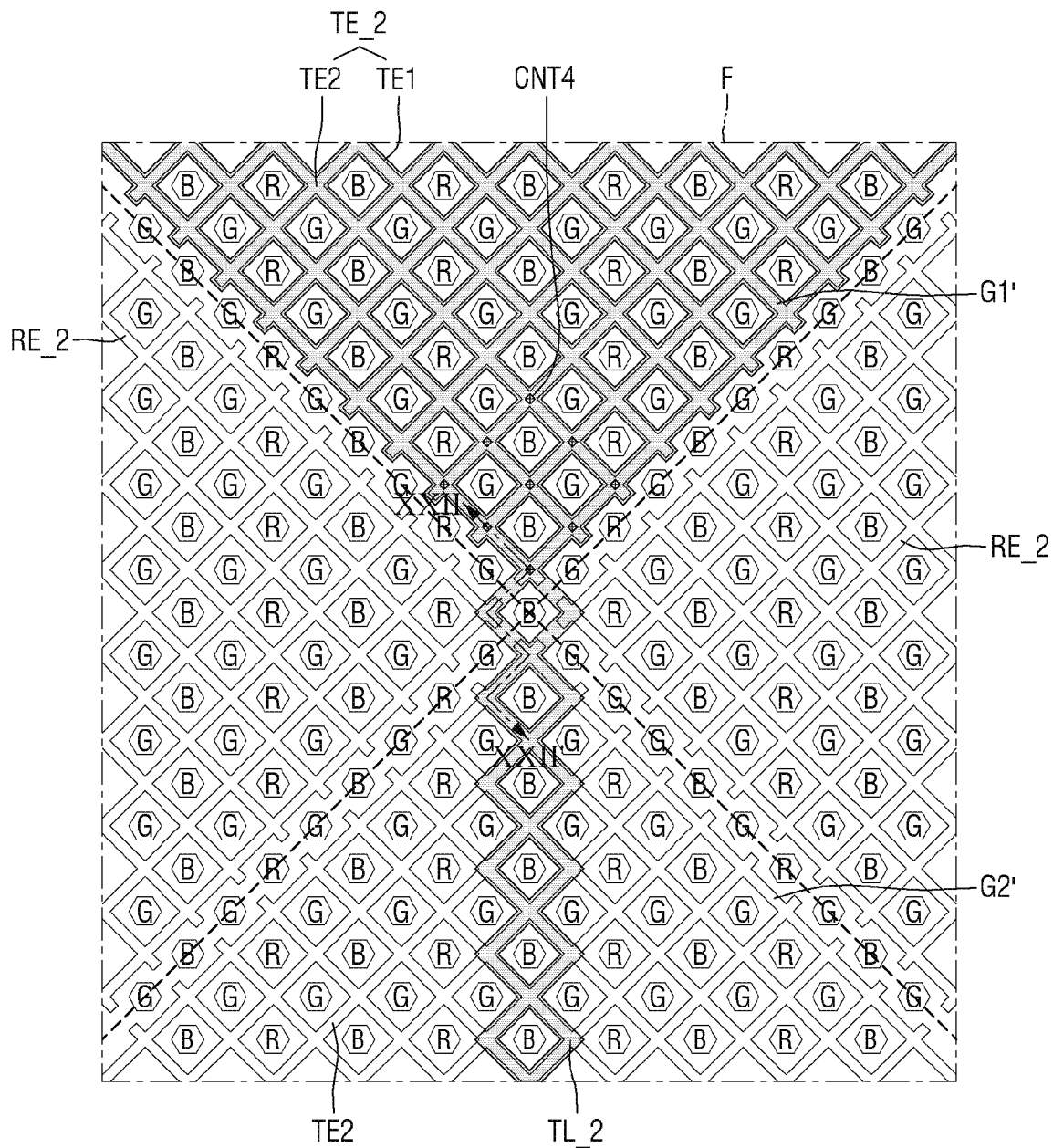
FIG. 20 is an enlarged view of region F of FIG. 18.

FIG. 20 is an enlarged view of region F of FIG. 18.

Referring to FIG. 20, the second sensing electrodes TE_2 may include first layer electrodes TE1 and second layer electrodes TE2.

The first layer electrodes TE1 of the second sensing electrodes TE_2 may be disposed in a part of a plurality of rows, and the second layer electrodes TE2 thereof may be disposed in all of the plurality of rows.

For example, as shown in FIGS. 18 to 20, the second sensing electrodes TE_2 disposed in a first row may be defined as a first group G1', and the second sensing electrodes TE_2 disposed in a second row may be defined as a second group G2'. The first group G1' and the second group G2' may be spaced apart from each other. The first layer electrode TE1 of the first group G1' may be disposed in a part of a first column. That is, the first layer electrode TE1 of the first group G1' may be disposed to overlap the second layer electrode TE2 disposed in the first column in a thickness direction thereof. In addition, the first layer electrode TE1 of the first group G1' may be disposed such that they do not overlap the second layer electrodes TE2 disposed in the remaining columns except for the first column of the first group G1'. Furthermore, the first layer electrode TE1 of the first group G1' may be disposed such that it does not overlap the second layer electrodes TE2 of the second group G2'.

FIG. 20 illustrates a case in which the first layer electrode TE1 of the first group G1' entirely overlaps the second layer electrode TE2 disposed in the first column, but the present disclosure is not limited thereto. That is, the first layer electrode TE1 of the first group G1' may be disposed to overlap one of the second layer electrodes TE2 disposed in other columns such as a second column.

The first layer electrode TE1 may be connected to the above-described second sensing line TL_2. The second sensing line TL_2 may have a shape that extends from one end of the first layer electrode TE1. The second sensing line TL_2 may extend from the first layer electrode TE1 to the second sensing pad TP2 disposed in the sensing peripheral area TPA. In this case, the second sensing line TL_2 may partially overlap the first sensing electrode RE_2 or the second sensing electrode TE_2 disposed in the sensing area TSA. For example, as shown in FIG. 20, the second sensing line TL_2 connected to the first layer electrode TE1 of the first group G1' may overlap the second sensing electrode TE_2 of the second group G2' in a thickness direction thereof. That is, the second sensing line TL_2 connected to the first layer electrode TE1 of the first group G1' may overlap the second layer electrode TE2 of the second group G2'.

The first layer electrode TE1 of each group may be electrically connected to the second layer electrode TE2 of each group through fourth contact holes CNT4. That is, the first layer electrode TE1 may serve to connect the second sensing line TL_2 and the second sensing electrode TE_2 disposed in each row. For example, the first layer electrode TE1 of the first group G1' may connect the second sensing line TL_2 and the second sensing electrodes TE_2 of the first group G1'. In addition, the first layer electrode TE1 of the second group G2' may connect the second sensing line TL_2 and the second sensing electrodes TE_2 of the second group G2'. FIG. 20 illustrates a case in which the fourth contact holes CNT4 are partially formed in one side, i.e., a lower side of the first layer electrode TE1, but the present disclosure is not limited thereto. That is, the fourth contact holes CNT4 may be formed in an entire region in which the first layer electrode TE1 and the second layer electrode TE2 overlap each other.

The first layer electrode TE1 may be disposed on the same layer as the second sensing line TL_2. The first layer electrode TE1 and the second sensing line TL_2 may be made of the same material. For example, the first layer electrode TE1 may be formed of a first sensing conductive layer 171 shown in FIG. 22. FIG. 20 illustrates a case in which the second sensing line TL_2 is connected to the second layer electrode TE2 through the first layer electrode TE1, but the present disclosure is not limited thereto. That is, the first layer electrode TE1 of the second sensing electrode TE_2 may be omitted, and the second sensing line TL_2 may be connected directly to the second layer electrode TE2. In this case, the second layer electrode TE2 may be connected directly to the second sensing line TL_2 through a contact hole passing through an insulating layer disposed thereunder.

The first layer electrode TE1 may have a mesh shape or a net shape. Since the first layer electrode TE1 has the mesh shape or the net shape, the subpixels R, G, and B do not overlap the first layer electrode TE1. Therefore, as described above, light output from the subpixels R, G, and B may be blocked by the first slayer electrode TE1, thereby preventing luminance of the light from being reduced.

Figure 21:
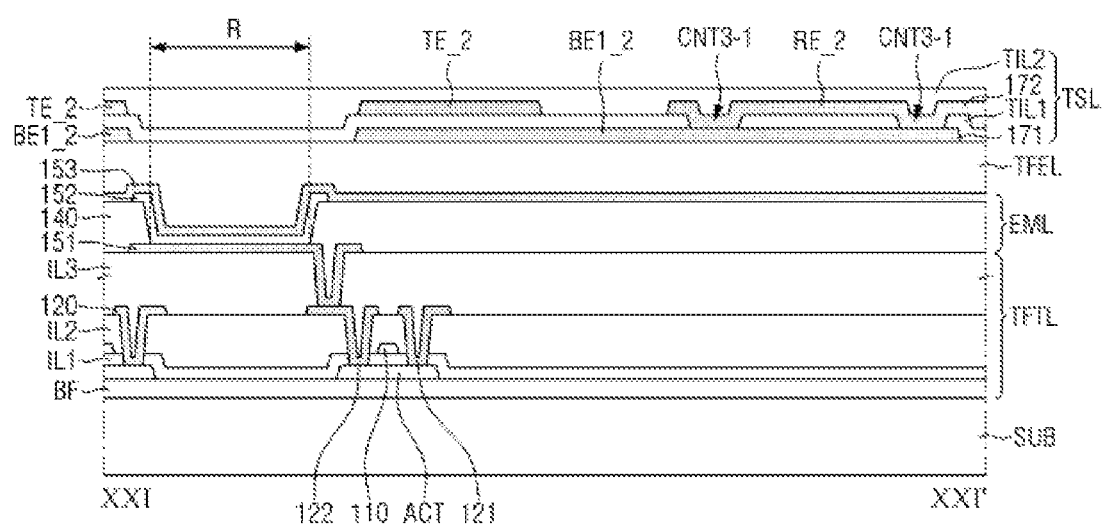
FIG. 21 is a cross-sectional view taken along line XXI-XXI' of FIG. 19.
Figure 22:
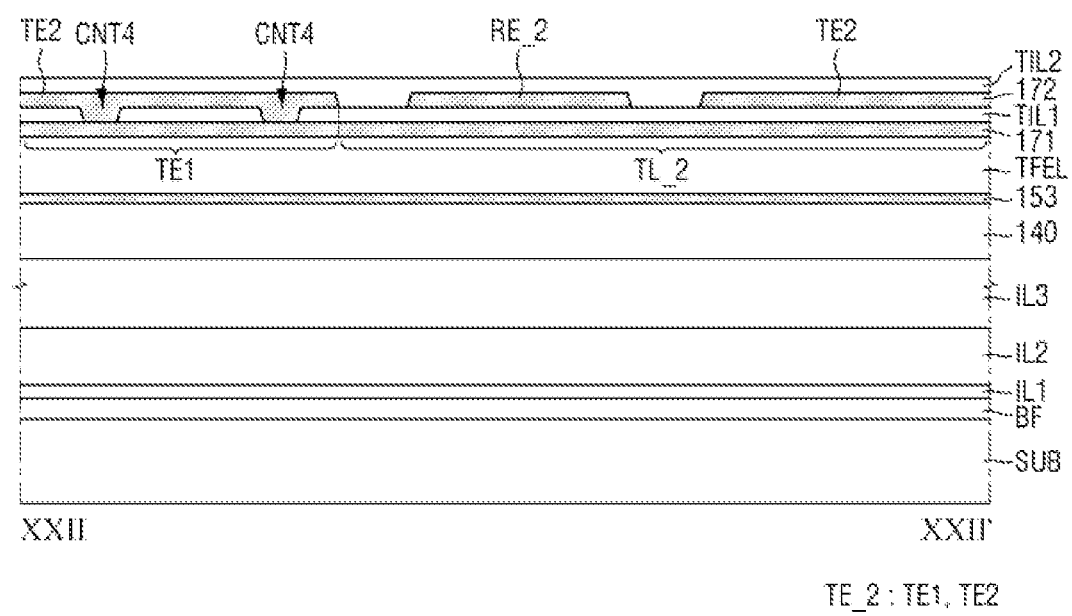
FIG. 22 is a cross-sectional view taken along line XXII-XXII' of FIG. 20.

FIG. 21 is a cross-sectional view taken along line XXI-XXI' of FIG. 19. FIG. 22 is a cross-sectional view taken along line XXII-XXII' of FIG. 20.

A connection structure between the first sensing electrode RE_2 and the first connection portion BE1_2 is shown in line XXI-XXI' of FIG. 19. A connection structure between the first layer electrode TE1 of the second sensing electrode TE_2, the second layer electrode TE2 thereof, and/or the second sensing line TL_2 is shown in line XXII-XXII' of FIG. 20.

Referring to FIGS. 21 and 22, a thin film transistor layer TFTL is disposed on a substrate SUB. The thin film transistor layer TFTL includes a buffer layer BF, a semiconductor layer ACT, a first insulating layer IL1, a first conductive layer 110, a second insulating layer IL2, a second conductive layer 120, and a third insulating layer IL3. Since the thin film transistor layer TFTL has been described with reference to FIGS. 11 and 12, a repetitive description thereof will be omitted.

The sensing layer TSL may be disposed on the thin film encapsulation layer TFEL. A buffer layer may be further formed between the thin film encapsulation layer TFEL and the sensing layer TSL.

The sensing layer TSL may include the first sensing conductive layer 171, a first sensing insulating layer TIL1, a second sensing conductive layer 172, and a second sensing insulating layer TIL2.

Each of the above-described layers may be formed as a single layer, but may also be formed as a stacked layer including a plurality of layers. Other layers may be further disposed between the respective layers.

The first sensing conductive layer 171 may include one selected from among, for example, molybdenum, titanium, copper, aluminum, and an alloy thereof. The first sensing conductive layer 171 may include the first layer electrode TE1 of the second sensing electrode TE_2, the second sensing line TL_2, and the first connection portion BE1_2, which are described above.

The first sensing insulating layer TIL1 may be disposed on the first sensing conductive layer 171.

The first sensing insulating layer TIL1 insulates the first sensing conductive layer 171 from the second sensing conductive layer 172. The first sensing insulating layer TIL1 may include an organic layer and/or an inorganic layer. For example, the organic layer may include at least one selected from among an acrylic-based resin, a methacryl-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin. For example, the inorganic layer may include at least one selected from among aluminum oxide, titanium oxide, silicon oxide, silicon oxynitride, zirconium oxide, and hafnium oxide. The first sensing insulating layer TIL1 may be disposed between the first layer electrode RE1 and the second layer electrode RE2x.

The second sensing conductive layer 172 may be disposed on the first sensing insulating layer TIL1. The second sensing conductive layer 172 may include the same material as the above-described first sensing conductive layer 171, or may include at least one material selected from among the materials exemplified as the constituent materials of the first sensing conductive layer 171. The second sensing conductive layer 172 may include the first sensing electrode RE_2, the second layer electrode TE2 of the second sensing electrode TE_2, and the second connection portion BE2_2, which are described above.

The first sensing electrode RE_2 may be connected to the first connection portion BE1_2 through the 3-1$^{st}$ contact hole CNT3-1 passing through the first sensing insulating layer TIL1. Accordingly, the first sensing electrodes RE_2 adjacent to each other in the second direction (Y-axis direction) may be connected through the first connection portions BE1_2.

The second layer electrode TE2 of the second sensing electrode TE_2 may be connected to the first layer electrode TE1 of the second sensing electrode TE_2 through the fourth contact holes CNT4 passing through the first sensing insulating layer TIL1. Therefore, the second layer electrode TE2 of the second sensing electrode TE_2 may be connected to the second sensing line TL_2 through the first layer electrode TE1.

The second sensing insulating layer TIL2 may be disposed on the second sensing conductive layer 172. The second sensing insulating layer TIL2 may serve to planarize a stepped portion formed due to the first sensing conductive layer 171 and the second sensing conductive layer 172. The second sensing insulating layer TIL2 may include the same material as the above-described first sensing insulating layer TIL1, or may include at least one material selected from among the materials exemplified as the constituent materials of the first sensing insulating layer TIL1.

According to the exemplary embodiment shown in FIGS. 17 to 22, the second sensing line TL_2 may be connected to the second sensing electrodes TE_2 disposed in each group through the first layer electrode TE1. In this case, the second sensing line TL_2 may extend from one end of the first layer electrode TE1 and be disposed in the sensing area TSA. Accordingly, as described above, since a space for arranging the second sensing lines TL_2 is unnecessary in the sensing peripheral area TPA, a non-display area NDA of a display device 10 may be reduced.

Figure 23:
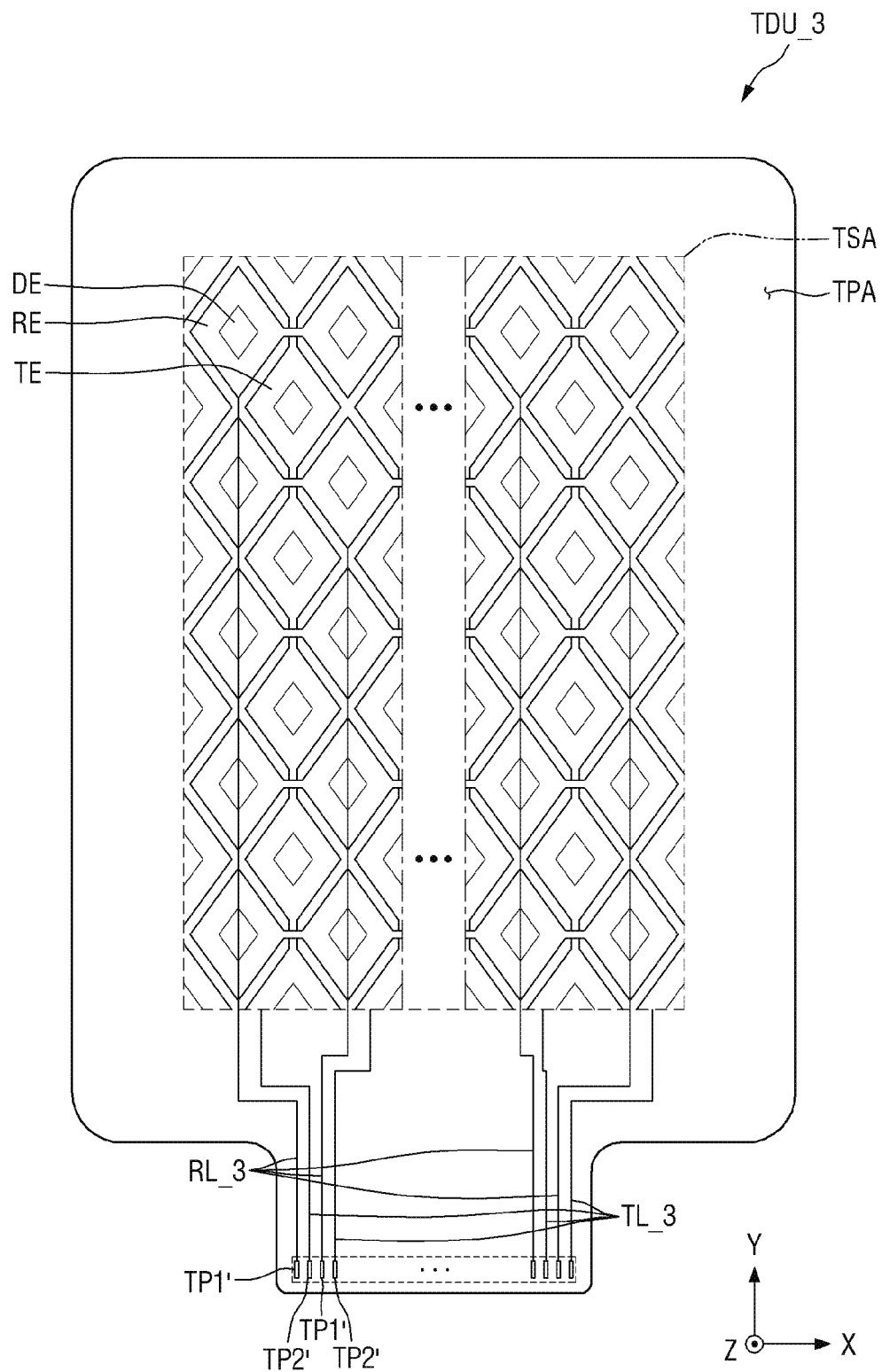
FIG. 23 is a plan view illustrating components related to a sensing unit according to an exemplary embodiment.

FIG. 23 is a plan view illustrating components related to a sensing unit according to an exemplary embodiment.

Referring to FIG. 23, an exemplary embodiment is different from the exemplary embodiment of FIGS. 1 to 12 in that, in a sensing unit TDU_3 according to an exemplary embodiment, first sensing pads TP1' and second sensing pads TP2' are alternately arranged.

For example, the first sensing pads TP1' and the second sensing pads TP2' may be disposed at one side of a sensing peripheral area TPA. For example, as shown in FIG. 23, the first sensing pads TP1' and the second sensing pads TP2' may be disposed in the sensing peripheral area TPA positioned at a lower side with respect to a sensing area TSA.

The first sensing pads TP1' and the second sensing pads TP2' may be alternately arranged in a first direction (X-axis direction).

The first sensing pad TP1' may be connected to one end portion of a first sensing line RL_3. The other end portion of the first sensing line RL_3 may be connected to a first sensing electrode RE. That is, the first sensing pad TP1' may be connected to the first sensing electrode RE through the first sensing line RL_3.

The second sensing pad TP2' may be connected to one end portion of a second sensing line TL_3. The other end portion of the second sensing line TL_3 may be connected to a second sensing electrode TE. That is, the second sensing pad TP2' may be connected to the second sensing electrode TE through the second sensing line TL_3.

The first sensing line RL_3 and the second sensing line TL_3 may be alternately arranged in the first direction (X-axis direction). The first sensing line RL_3 and the second sensing line TL_3 may be spaced apart from each other. That is, in an exemplary embodiment, the first sensing line RL_3 does not overlap the second sensing line TL_3 in a thickness direction thereof.

The first sensing line RL_3 may extend from the first sensing pad TP1' and be disposed in the sensing area TSA. Accordingly, since a space for arranging the first sensing line RL_3 is unnecessary in the sensing peripheral area TPA, a non-display area NDA of a display device 10 may be reduced.

According to a sensing unit and a display device according to exemplary embodiments, a sensing line is disposed in a sensing area overlapping a display area, thereby reducing a non-display area of a display device.

While the present disclosure has been particularly shown and described with reference to the exemplary embodiments thereof, it will be understood by those of ordinary skill in the art that various changes in form and detail may be made therein without departing from the spirit and scope of the present disclosure as defined by the following claims.

What is claimed is:

1. A sensing unit, comprising:
a plurality of first sensing electrodes of a first group disposed in a sensing area in a first direction; and
a first sensing line electrically connected to one of the first sensing electrodes of the first group,
wherein the first sensing line is disposed in the sensing area and extends in a second direction intersecting the first direction,
the first sensing electrodes of the first group include first layer electrodes and second layer electrodes disposed on the first layer electrodes, and
one of the first layer electrodes is connected to one end of the first sensing line.

2. The sensing unit of claim 1, wherein the first layer electrode and the first sensing line are disposed on a same layer.

3. The sensing unit of claim 2, further comprising:
a first sensing insulating layer disposed between one of the first layer electrodes and one of the second layer electrodes,
wherein the one of the second layer electrodes is in contact with the one of the first layer electrodes through a contact hole passing through the first sensing insulating layer.

4. The sensing unit of claim 1, further comprising:
a plurality of conductive patterns electrically separated from the first sensing electrodes.

5. The sensing unit of claim 4, wherein the conductive pattern is surrounded by one of the first sensing electrodes.

6. The sensing unit of claim 4, wherein one of the conductive patterns overlaps the first sensing line in a thickness direction thereof.

7. The sensing unit of claim 6, further comprising:
a plurality of second sensing electrodes disposed in the second direction and electrically separated from the first sensing electrodes.

8. The sensing unit of claim 7, further comprising:
a connection portion connecting the second sensing electrodes adjacent to each other in the second direction,
wherein the first sensing line and the connection portion are disposed on a same layer.

9. The sensing unit of claim 8, further comprising:
a first sensing insulating layer disposed between one of the second sensing electrodes and the connection portion,
wherein the one of the second sensing electrodes is in contact with the connection portion through a contact hole passing through the first sensing insulating layer.

10. The sensing unit of claim 7, further comprising:
a second sensing line electrically connected to one of the second sensing electrodes,
wherein the first sensing line and the second sensing line are alternately arranged in the first direction.

11. The sensing unit of claim 10, wherein the first sensing line and the second sensing line are spaced apart from each other and do not overlap in a thickness direction thereof.

12. The sensing unit of claim 10, further comprising:
a first sensing pad area positioned outside the sensing area; and
a second sensing pad area spaced apart from the first sensing pad area,
wherein the first sensing pad area includes a first sensing pad connected to the first sensing line, and the second sensing pad area includes a second sensing pad connected to the second sensing line.

13. The sensing unit of claim 12, wherein the first sensing line overlaps the second sensing line in a thickness direction thereof.

14. A sensing unit, comprising:
a plurality of first sensing electrodes of a first group disposed in a sensing area in a first direction;
a plurality of first sensing electrodes of a second group disposed in the first direction, wherein the second group is spaced apart from the first group; and
a first sensing line electrically connected to one of the first sensing electrodes of the first group,
wherein the first sensing line is disposed in the sensing area and overlaps one of the first sensing electrodes of the second group in a plan view,
wherein each of the first sensing electrodes of the first group and the first sensing electrodes of the second group includes a first layer electrode and a second layer electrode disposed on the first layer electrode,
wherein the first layer electrode is disposed on a same layer as the first sensing line.

15. The sensing unit of claim 14, wherein the first sensing line extends in the sensing area in a second direction intersecting the first direction.

16. The sensing unit of claim 14, wherein one end of the first sensing line is connected to the first layer electrode of one of the first sensing electrodes of the first group.

17. The sensing unit of claim 14, wherein the first sensing line overlaps the second layer electrode of one of the first sensing electrodes of the second group in a thickness direction thereof.

18. The sensing unit of claim 14, further comprising:
a first sensing insulating layer disposed between the first layer electrode and the second layer electrode,
wherein the second layer electrode of one of the first sensing electrodes of the first group is in contact with the first layer electrode through a contact hole passing through the first sensing insulating layer.

19. A display device, comprising:
a substrate including a display area;
a light-emitting layer disposed on the substrate; and
a sensing unit disposed on the light-emitting layer and including a plurality of first sensing electrodes of a first group disposed in a sensing area overlapping the display area in a first direction, and a first sensing line electrically connected to one of the first sensing electrodes of the first group,
wherein the first sensing line is disposed in the sensing area and extends in a second direction intersecting the first direction,
the first sensing electrodes of the first group include first layer electrodes and second layer electrodes disposed on the first layer electrodes, and
one of the first layer electrodes is connected to one end of the first sensing line.

20. The display device of claim 19, further comprising:
a pixel disposed in the display area; and
a pixel definition layer disposed between the substrate and the light-emitting layer and defining an emission area of the pixel,
wherein the first sensing electrodes overlap the pixel definition layer in a thickness direction thereof.

21. The display device of claim 20, further comprising:
a plurality of second sensing electrodes disposed in the second direction and electrically separated from the first sensing electrodes.

22. The display device of claim 21, further comprising:
a connection portion connecting the second sensing electrodes adjacent to each other in the second direction,
wherein the first sensing line and the connection portion are disposed on a same layer.

\* \* \* \* \*